United States Patent [19]

Ibanez et al.

[11] Patent Number: 4,974,257
[45] Date of Patent: Nov. 27, 1990

[54] MODULAR PUBLIC TELEPHONE FOR OUTSIDE USE

[75] Inventors: Francisco P. Ibañez; Manuel M. J. Garcia, both of Madrid, Spain

[73] Assignee: Telefonica De Espana, S.A., Madrid, Spain

[21] Appl. No.: 391,789

[22] Filed: Aug. 9, 1989

[30] Foreign Application Priority Data

Apr. 28, 1989 [ES] Spain .................................. 8901506

[51] Int. Cl.⁵ .................... H04M 11/00; H04M 11/02
[52] U.S. Cl. .................................... 379/143; 379/144; 379/145; 379/434; 379/435
[58] Field of Search ................ 379/146, 428, 143–145, 379/434–440; 312/101, 247

[56] References Cited

U.S. PATENT DOCUMENTS 4,731,819  3/1988  Kalfon ................................ 379/143

Primary Examiner—Stafford D. Schreyer
Attorney, Agent, or Firm—Mason, Fenwick & Lawrence

[57] ABSTRACT

A modular public telephone has two independent armored boxes, one of which contains the telephone mechanism and the other of which is a strong coin receiving box. Both boxes are provided with front doors, and the upper box has a number of windows for receiving the respective operating modules including a coin insertion module a credit card insertion module, a display module, a keyboard module, a coin return module and a handset receiving module. A number of the modules can be interchanged or substituted.

12 Claims, 20 Drawing Sheets

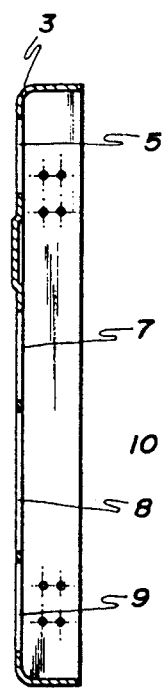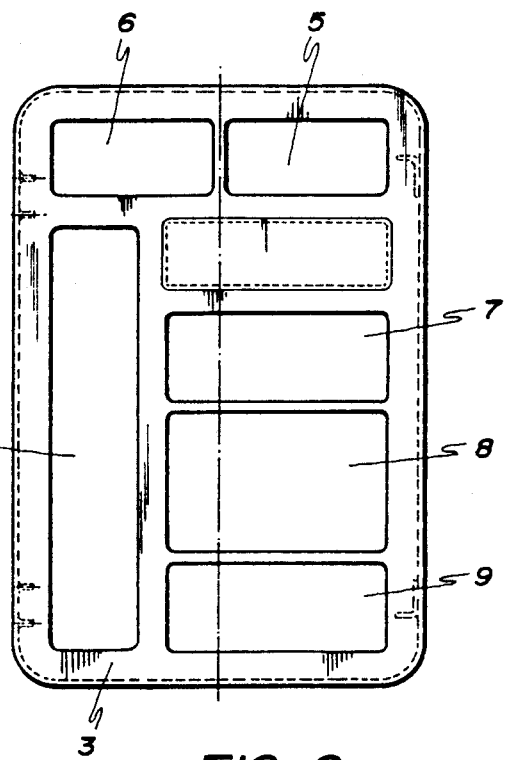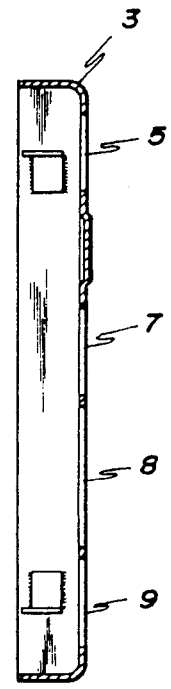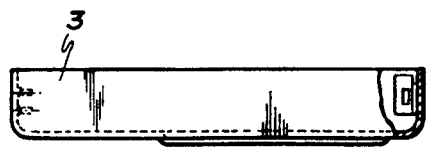
FIG.-4　　FIG.-2　　FIG.-3
FIG.-5

A-B

C-D

E-F

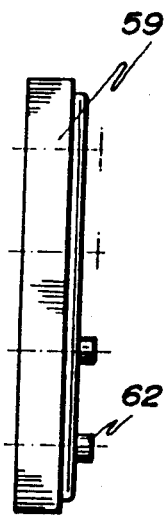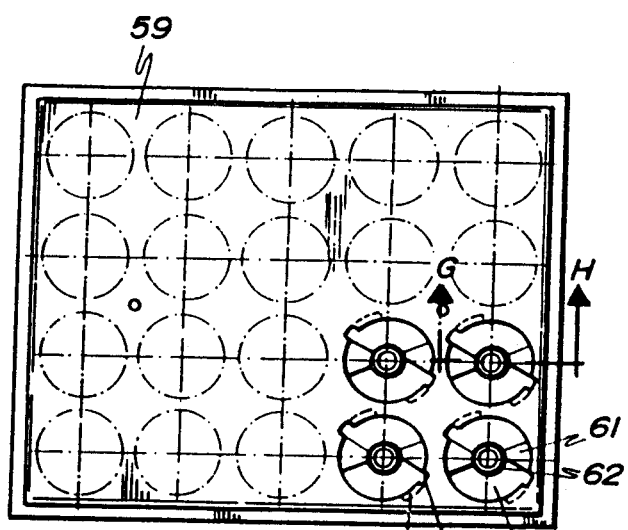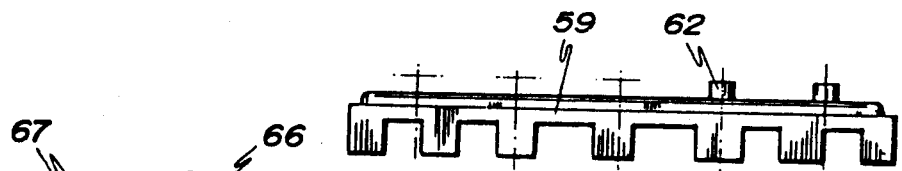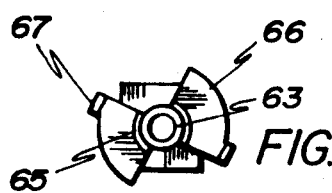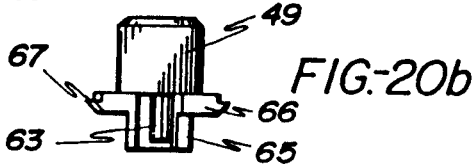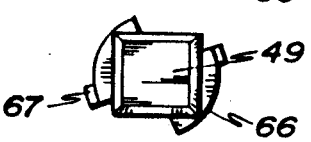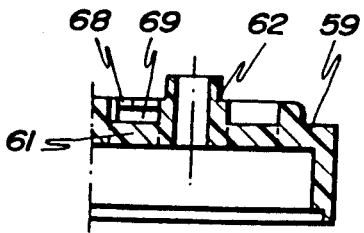

I-J

K-L

M-N

O-P

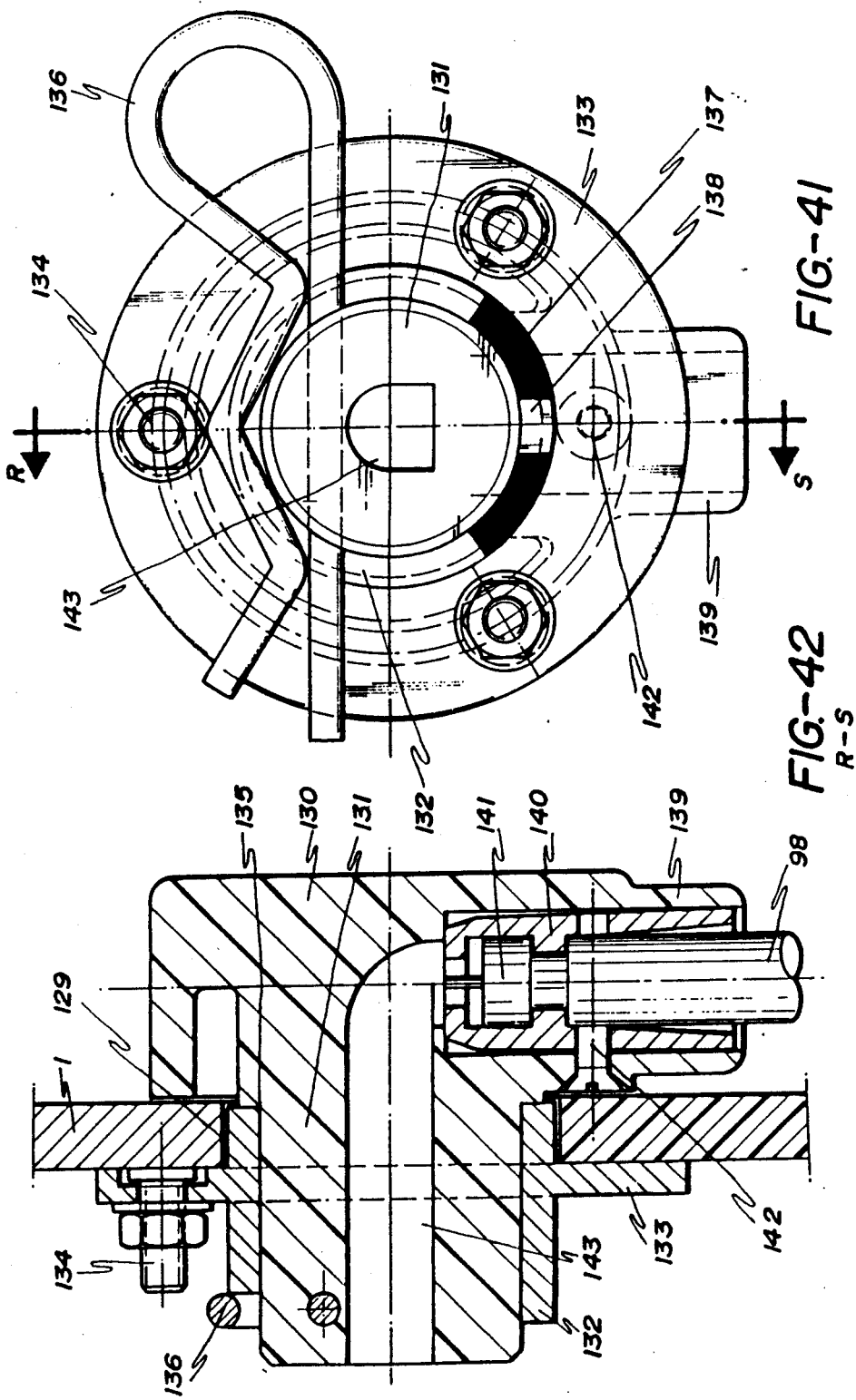

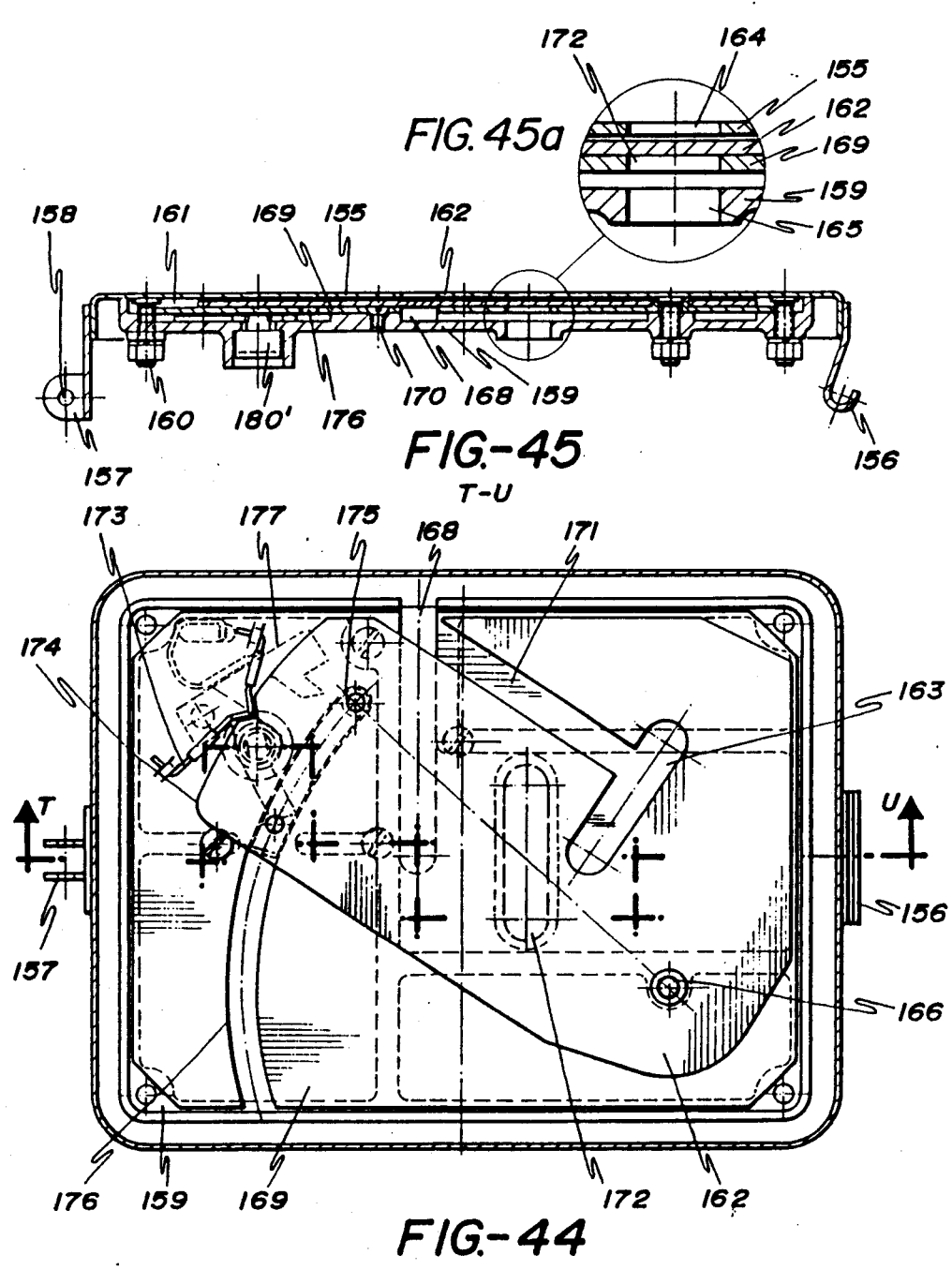

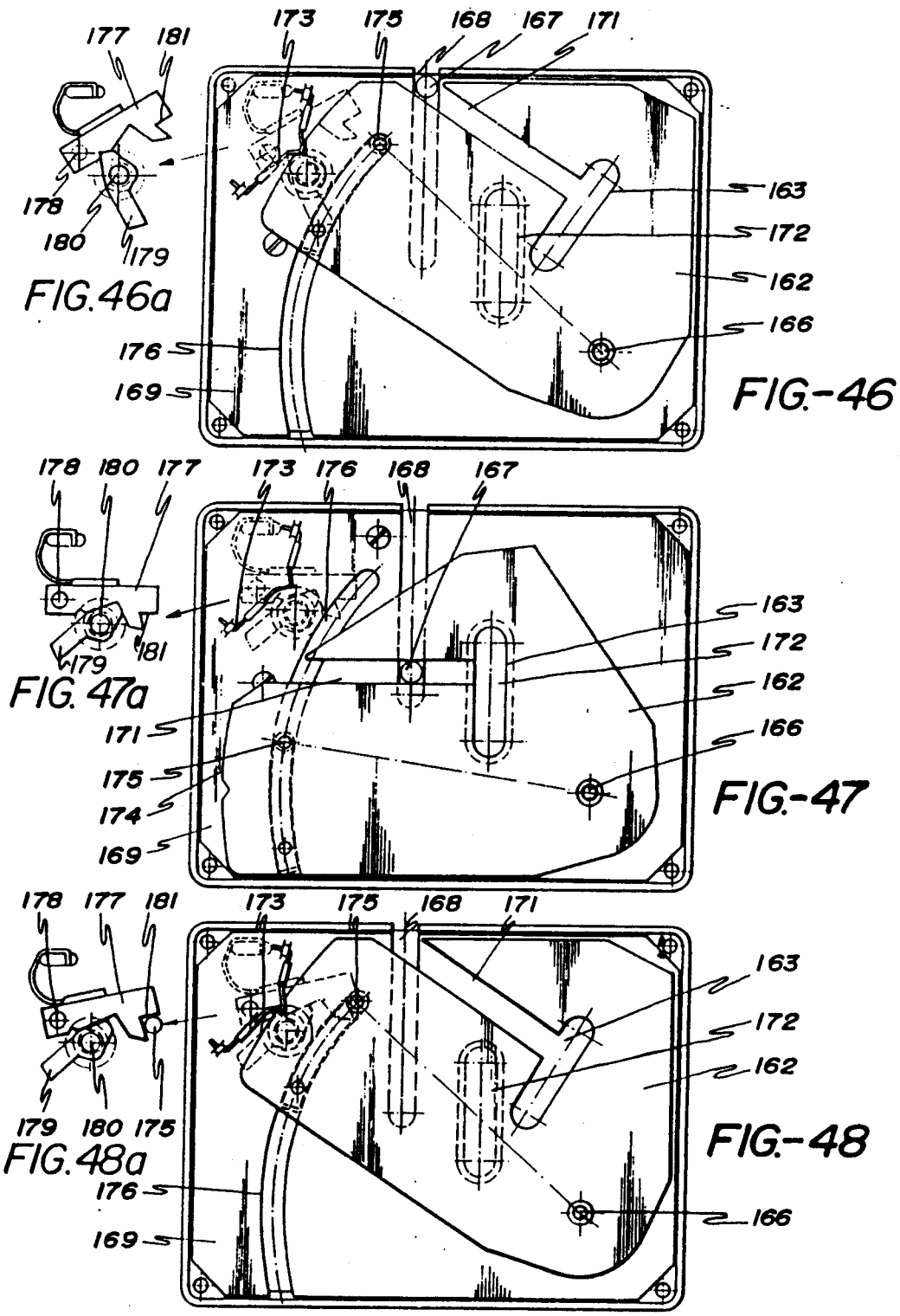

MODULAR PUBLIC TELEPHONE FOR OUTSIDE USE

OBJECT OF THE INVENTION

This invention refers to a public telephone, of the type designed to be installed in public call boxes and similar places, that is to say, in places where there is no direct personal control over it and where in consequence, there is a high risk of deliquent behaviour leading to the robbery of the money collected.

The telephone which is preconized shows structural characteristics which make it practically impossible for the said deliquent behaviour to be successful and moreover make it capable of withstanding abuse, including the real ill treatment of acts of vandalism, without serious risk of ruining its components and without losing the use of it.

The telephone in question is capable of working with coins or credit cards, with a modular structure which allows the corresponding mechanisms for one or other form of payment to be installed in it or not, without this signifying any modification to its basic structure.

Another of the objectives of the invention consists in achieving a control over the money collected, in such a way that the worker responsible for this task does not have direct access to the coins.

BACKGROUND TO THE INVENTION

As is known, public telephones, especially telephones installed in call boxes which provide shelter, have for a long time proved to be a focus of attention for deliquents, and therefore in this type of telephone more and more resistant bodies have been used, keyboards which are more robust and in general it has been the intention to make the apparatus more inviolable in all its aspects.

Nevertheless, the remedies which have been adopted in this respect lack "flexibility", since "from them are derived monobloc units in which it is not possible to make modifications, so that each specific application of a defined type of telephone conforms to a practical embodiment substantially different from all the rest, practically throughout the whole of the process of constructing it.

However, in practice sometimes telephones working exclusively with coins are required, sometimes exclusively with credit cards or working indiscriminately with one or the other of the methods of payment, and therefore it would be desirable to have a telephone which, starting with a basic structure which does not change, could be adapted to any one of these requirements.

It would also be desirable to have a rapid and simple form of assembly, in spite of the extraordinary structural rubustness which this type of public telephone should offer, but nevertheless conventional telephones of this type have a complex form of assembly.

Another problem of this type of telephone is centred around certain weak points which exist in them which make them vulnerable, as for example the liquid crystal screen by means of which information is passed to the user, or the exit slot for coins which were not needed or which are defective.

A problem public telephones also suffer from is that it is impossible to keep control over the money collected, so that it depends upon the honesty of the collectors, since although there are means of electronically counting the coins which are inserted in the apparatus, in many cases the theoretical figure cannot coincide with the real figure because of failures in the apparatus or because of the various tricks employed by some users, which do not permit the categorical establishment of whether some coins are missing through theft by the user or by the collector.

DESCRIPTION OF THE INVENTION

With the public telephone which the invention sets forth the previously explained problem is solved completely satisfactorily, in each and every one of its various aspects, the said telephone offering a modular structure, which allows the use or the suppression in each case of certain components, and this is with a rational assembly process which is rapid and simple at the same time as the whole telephone provides maximum rigidity, being practically inviolable, and with an absence of weak points, to which it must be added moreover that it has complete and automatic control over the money collected.

Therefore, and more specifically, the public telephone which the invention sets forth is basically structured from two boxes, one on top which receives the various mechanisms for Its operation and the other below made up of a strong box for receiving the money, both boxes being physically independent and capable of being joined together by any method, in such a way that the strong box or lower case can be eliminated, specifically when the public telephone is intended for use with credit cards only.

Both the upper and the lower boxes are fitted with doors which cover the whole of their front and which are provided with security locks.

The door of the upper box, shaped like a rectangular frying pan with the concave facing the rear, has a number of windows designed for the connection of the corresponding modules, specifically two upper windows, beside each other in a lateral direction, one for the incorporation of the module for insertion of credit cards, and the other for the incorporation of the module for the insertion of coins. Below them and vertically lined up with them is a window for inserting the module corresponding to the viewing screen for providing information, immediately below another for insertion of the module which provides the keyboard and below another for the insertion of the module for returning coins, whilst to the side of these three latter windows another is situated, long in a vertical sense, for connecting the module for hanging up the hand set.

For use in conjunction with this structure there are also a series of caps which can be fitted into some of these windows, specifically in substitution of the module for the insertion of credit cards, of the module for the insertion of coins and the module for the return of the latter, and even in substitution for the information viewing module when it is a practical assembly in which the said screen is not considered necessary.

In the bottom of the upper box and immediately below the module for inserting coins, a conventional coin collector is located, incorporating a movable lever, operated by an external push button for the classical and necessary job of acting on the coin selector in order to achieve the dislodging of coins in it.

Beneath the selector of coins is situated a storage box which can accept a considerable number of coins and which, duly controlled by the telephone microprocessor, allows these to be used progressively and correctly, as the telephone conversation is running its course, with return of the remaining coins on finishing the call, a return which is effected by means of the corresponding module situated below the keyboard, it being evident that all of these elements, that is to say, coin insertion module, coin selector, storage box and coin return module, will not be incorporated in those cases in which a practical unit in which a telephone working exclusively with credit cards is envisaged.

The module for viewing information has, as a special characteristic, the front of the corresponding liquid crystal screen protected by a piece of glass, either single or multiple layers, of sufficient thickness to be able to withstand blows of great force.

As for the keyboard, this in turn has as an essential characteristic, the special form of assembly of the keys on the corresponding base, specifically a bayonet system which makes the said assembly extremely rapid and simple, the keys being immovable after assembly thanks to their prismatic-poligon shape, or rather prismatic quadrangular shape, and subsequently they remain immovable thanks to a lid which covers all of them, provided with small windows which coincide correctly, dimensionally and positionally with the said keys.

Both the information viewing module and the keyboard module are provided with long threaded rear fixing bolts which pass through holes in the back of a sort of frying pan installed inside the upper box and which specifically adapts in shape at its mouth to the interior face of the door, pressing against the latter on tightening the nuts which are on the aforementioned bolts and consequently housing the two aforementioned modules in its interior.

The coins return module, into which evidently the storage box empties them, is shaped like a sort of tray open at the front, provided with a flap-door also on the front which swings back and up, with the particular feature that in the bottom of the said tray, whose wall is inclined upwards and backwards, is located an oblique partition with which, in turn, the free edge of the flap-door comes into contact when it swings, so that when the tray is opened to get access to the coins located inside it, the flap-door itself closes off the upper opening of the tray on coming into contact with the aforementioned oblique partition.

All of these modules, specifically with reference to their front exterior face, are made in material of great hardness, and the solution to obtain the joints in the pieces which swing up and down is also noteworthy, a solution according to which the spindles providing the swinging movement of the said pieces fit, at their ends, into housings in those pieces which receive them and they remain firmly in place simply by the union of the said pieces with other complementary pieces, which close off the openings in the said housings.

Obviously the cable which links the mechanisms of what, correctly speaking, is the telephone itself with the telephone handset, is adequately armoured, the exit being located on the side of the upper box for the said cable, specifically through a mechanism which allows a certain amount of swinging movement, of the order of 90°, so that the said cable moves by itself into the best position without being subject to wear.

The security locks, both for the door of the upper box and for the door of the lower strong box have multiple catch mechanisms and opening them in both cases is carried out through an adequate lock fitted on the side wall of the box, by remote control, from the telephone exchange itself at the request of the workman who is in the call box. Also noteworthy is the existence in the locking mechanism of the lower body or strong box of a push rod which after the catch unit has been freed, pushes on the door to initiate the opening of it, which is very important when it is taken into account that it has no method for gripping it manually and that its weight, because of its robustness, is quite considerable.

Finally and in accordance with another characteristic of the invention, the coins which are inserted in the telephone do not fall directly into the interior of the previously mentioned lower body or strong box, but what they do is to fall into a kind of money box, a money box with the peculiarity that it has a lid on which a seal can be attached and in the lid there is a mechanism which, when the said money box is lodged inside the strong box, forms an orifice which allows the coins to pass into the money box, as they fall from the corresponding coins store situated in the upper box through openings facing each other and operating between the two boxes, whilst at the moment in which the said money box is extracted, and merely by the action of extracting it, the access slot to it is closed by the aforementioned mechanism and the contents of the money box are completely inaccessible, and to reach the coins inside it is necessary to break the seal on its lid.

DESCRIPTION OF THE DRAWINGS

In order to complement the description which is being made and with the object of contributing to a better understanding of the characteristics of the invention, attached to this descriptive memorandum, as an integral part of it, a set of drawings in which in a illustrative but not limiting nature, the following has been depicted:

FIGS. 2, 3, 4, and 5.—Show respective aspects of the piece which forms the door corresponding to the upper box, the various small windows which receive the corresponding modules which are used in the telephone being especially visible in FIG. 2.

FIGS. 17, 18 and 19, Respectively.—Show a front elevation and two profiles of the base piece for the keys.

FIGS. 20A, 20B, and 20C, respectively.—Show a lower plan view, an elevation and an upper plan view of one of the said keys.

FIG. 21.—Shows a close up section of the base shown in FIG. 17, in accordance with the cutting line G—H of the same figure.

FIG. 41.—Shows a close up front section of the exit mechanism for the armoured cable which connects the the upper box to the telephone hand set.

FIG. 42.—Shows a sectional view of the same mechanism, in accordance with the cutting line R—S of the previous figure.

FIG. 44.—Shows a plan view of the lid of the money box which is housed inside the aforementioned strong box, with its corresponding shutter mechanism.

FIG. 45.—Shows a transversal sectional close up of the said lid in accordance with the cutting line T—U of FIG. 44.

FIG. 45A.—Shows an enlarged view of section A of FIG. 45.

FIGS. 46, 46A, 47, 47A, 48 and 48A.—Show, finally, the mechanism of the FIG. 44, in its succesive operating phases corresponding to putting the money box in and taking it out from inside of the strong box.

PREFERABLE MATERIALIZATION OF THE INVENTION

Figure 1:
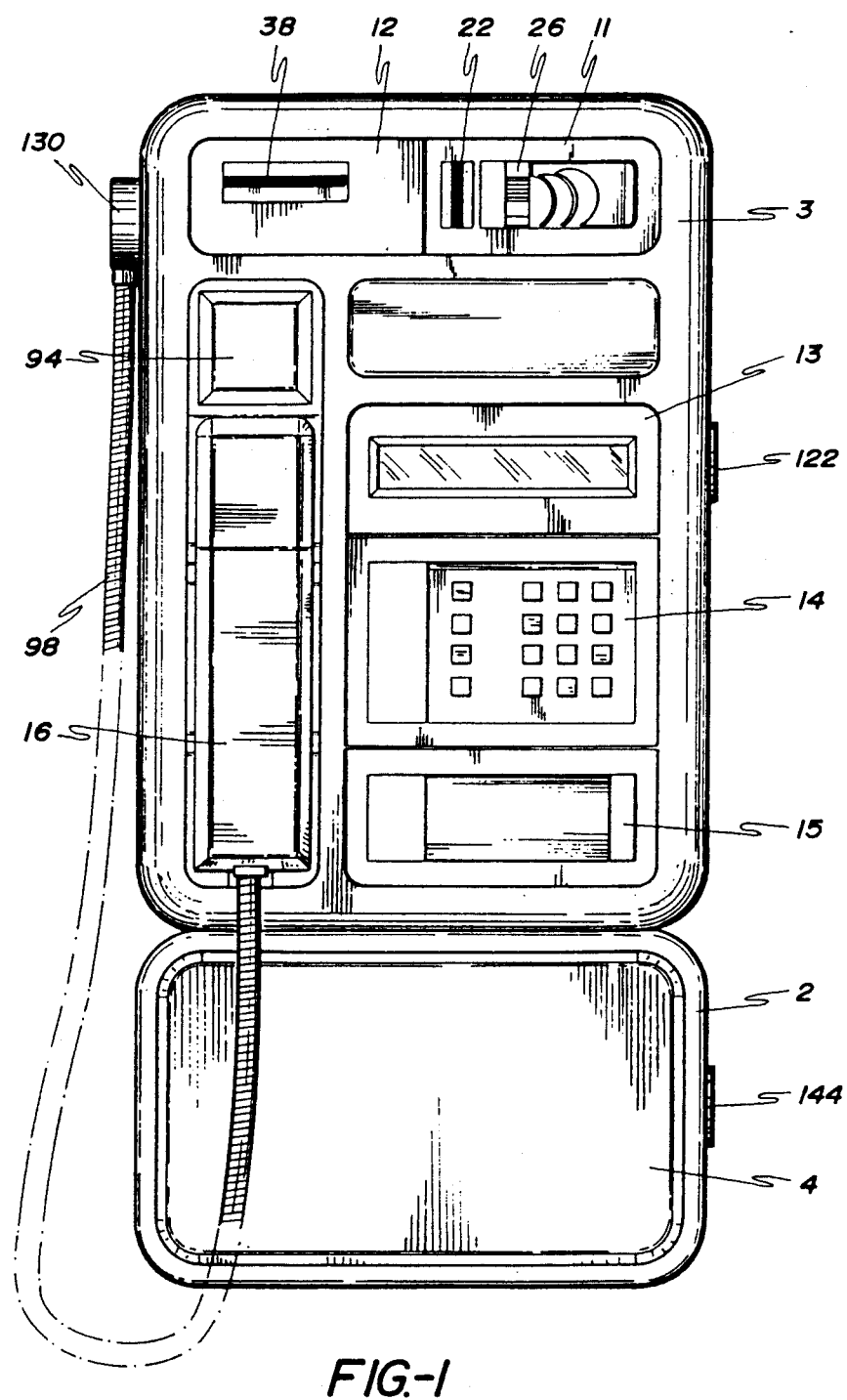
FIG. 1.—Shows a frontal elevation of a public telephone executed in accordance with the object of the present invention and in accordance with its broadest operating range, that is to say, with a practical execution in which the telephone can be operated both with coins and with credit cards.
Figure 6:
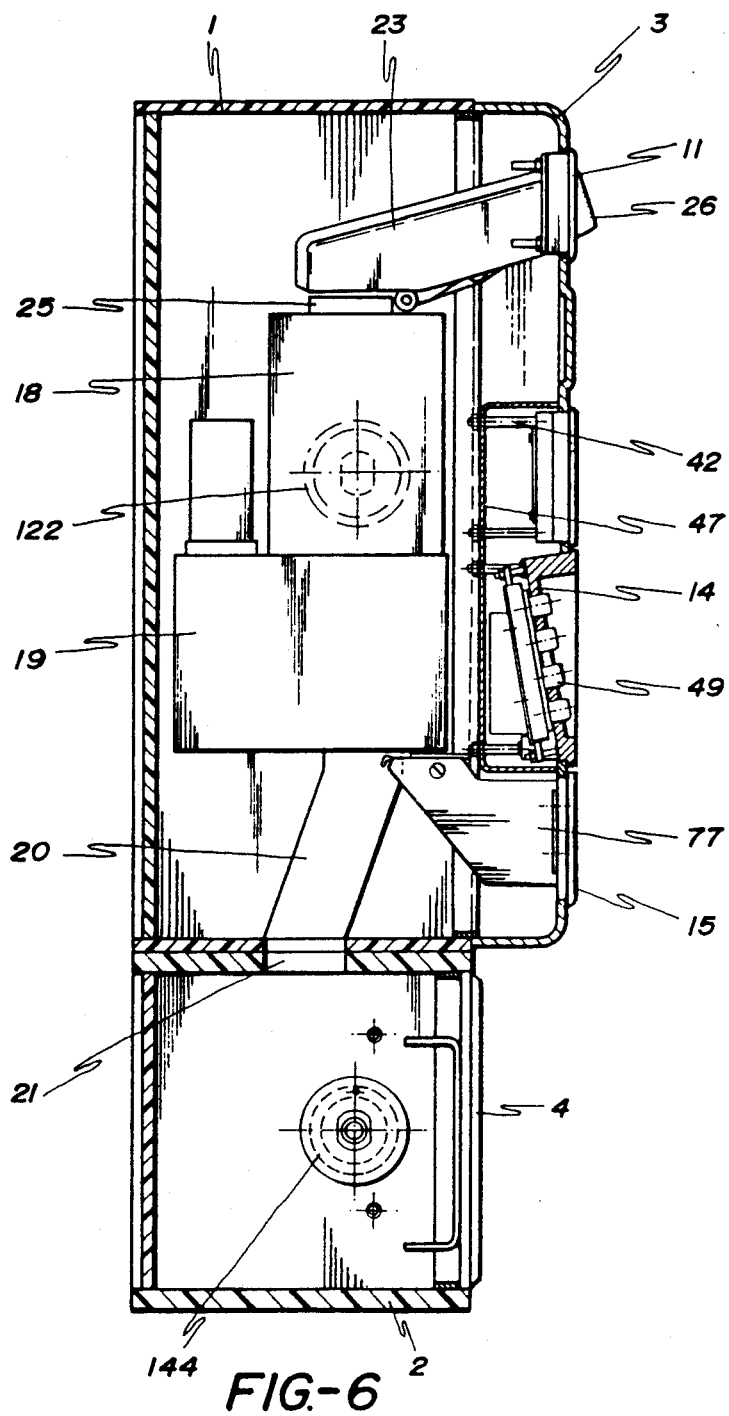
FIG. 6.—Shows a side elevation and in section of the same telephone, in which have been repesented schematically the various operating modules which can be incorporated into it.

In view of the these figures and more specifically FIGS. 1 and 6 it can be seen how the public telephone which is preconized is made up of two physically seperate boxes 1 and 2 which can be placed one on top of the other and joined together by any conventional method, the box 1 being designed to house the operating mechanisms of the telephone, whilst the box 2 takes the form of a strong box to receive the progressive collection of coins from the same, and which in consequence need not exist when it is foreseen that the said telephone will use exclusively credit cards. The box 1 receives in the front the corresponding door 3, shaped basically in the manner of a prismatic-rectangular frying pan, concaved towards the rear, and which covers the whole of the front of the box 1, whilst the strong box 2 is in turn provided with a front fitting door 4 also independent from the previously mentioned one.

Figure 28:
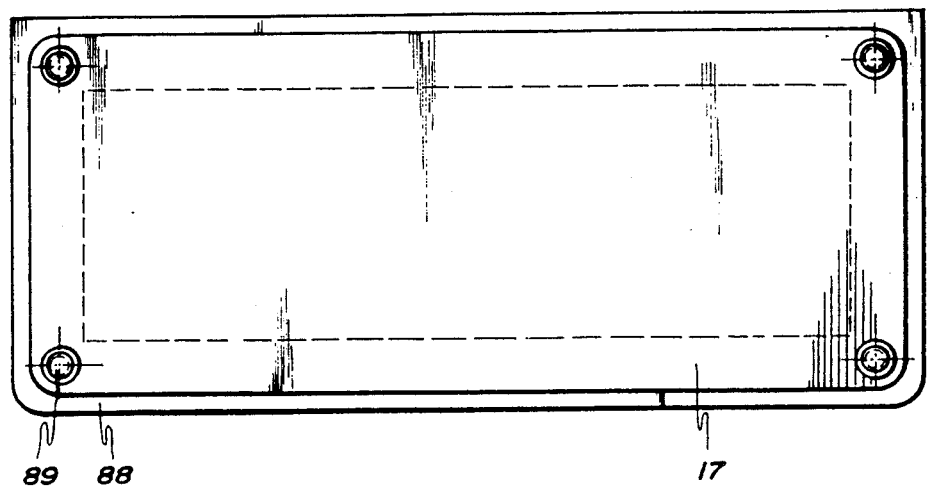
FIGS. 28, 29 and 30.—Show a rear elevation and two elevations of a cap for closing off the window corresponding to the coin return module, when it is not needed.
Figure 29:
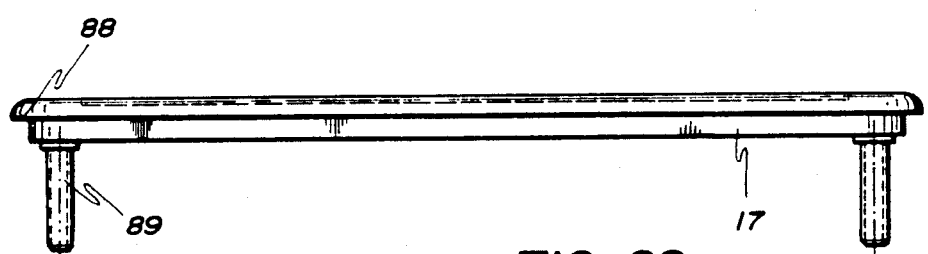
Figure 30:
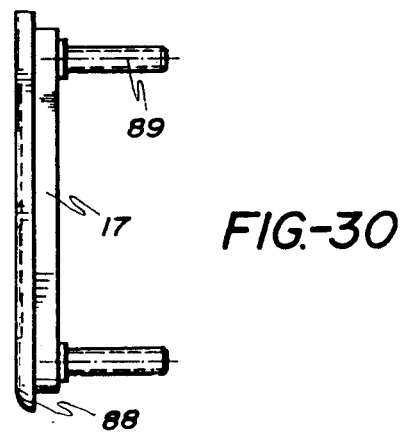
Figure 33:
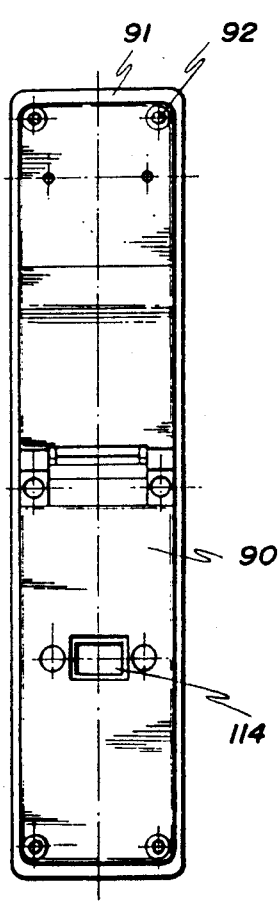
FIG. 33.—Shows a rear elevation of the same module.
Figure 32:
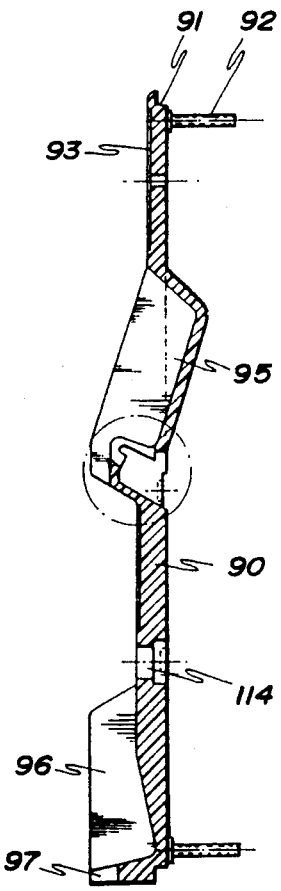
FIG. 32.—Shows a sectional profile of the same module, in accordance with the cutting line K—L of FIG. 31.
Figure 31:
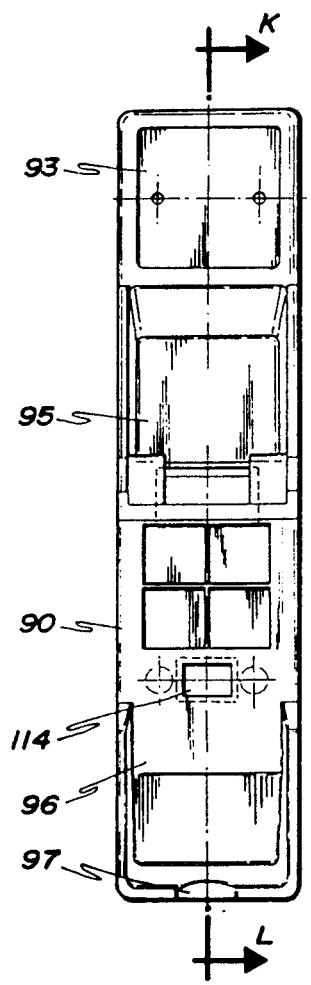
FIG. 31.—Shows a front elevation of the module for hanging up the telephone hand set.
Figure 34:
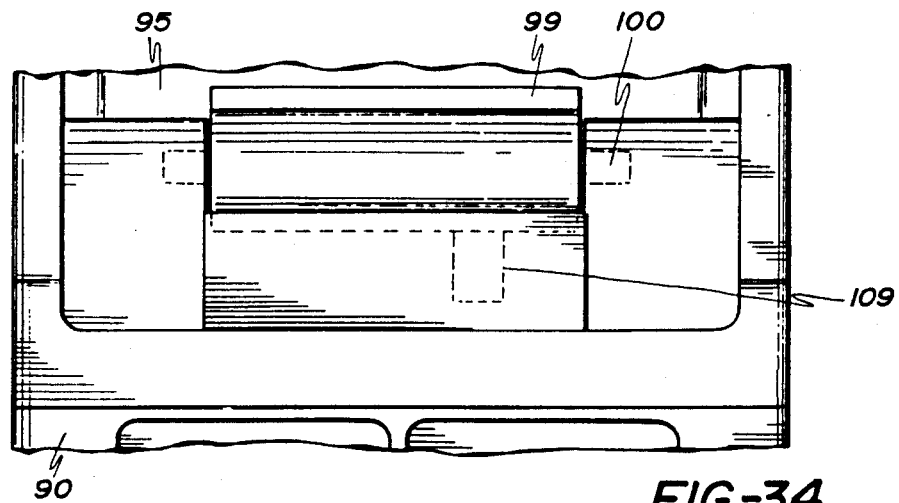
FIG. 34.—Shows a larger close up view of the module shown in FIG. 31, at the level of the side lever which actuates the corresponding switch.
Figure 35:
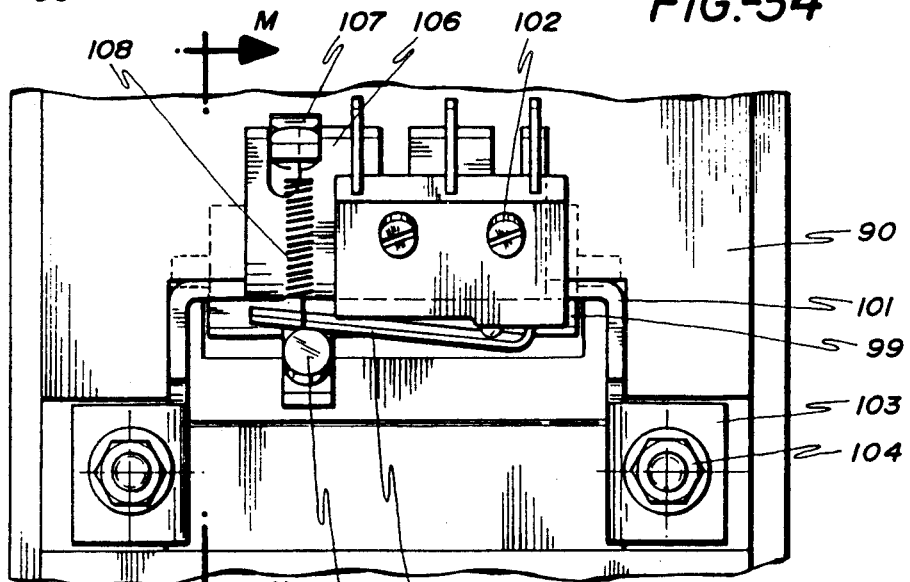
FIG. 35.—Shows the same close up view of the previous figure in accordance with to the rear elevation.
Figure 36:
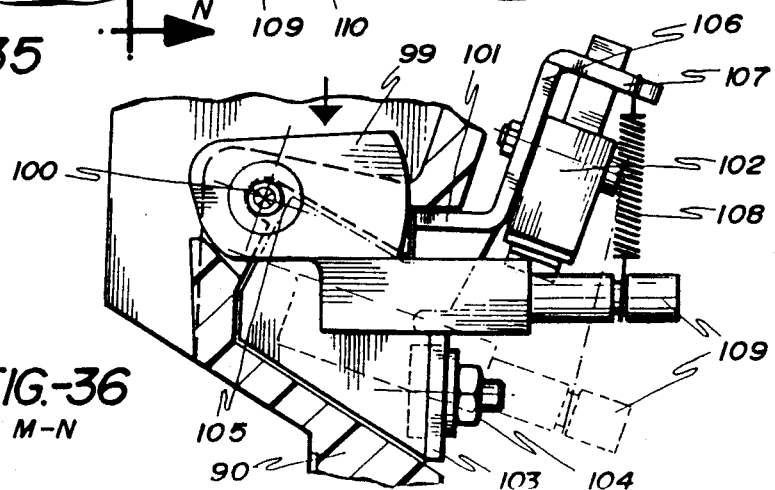
FIG. 36.—Shows a sectional profile of this same close up view, in accordance with the cutting line M—N of the said figure.

The upper door 3 is provided with a number of windows 5, 6, 7, 8, 9, and 10, as can be seen especially in FIG. 2, these windows being designed to receive their respective modules, specifically the coin insertion module 11, the module for insertion of credit cards 12, the module for viewing information 13, the keyboard module 14, the coin return module 15, and the module for hanging up the telephone handset 16, with the possibility that some of the said modules are not installed, as for example the module 12 when it is foreseen that the telephone will be used exclusively with coins, or the modules 11 and 15, when it is foreseen that it will be used exclusively with credit cards, these modules can be substituted by corresponding caps, as the one with the reference number 17 and shown in detail in FIGS. 28 to 30.

Moreover, and as can also be seen in FIG. 6, in the interior of box 1 and below the module for inserting coins 11 a coin selector is located 18, of any conventional type, below this a storage box 19 where the telephone stores the coins which have been inserted and from where they pass progressively, through a channel 20 to the strong box 2, as the telephone conversation continues, and for which purpose the boxes 1 and 2 incorporate holes facing each other 21 and facing the channel 20, whilst at the end of the call the excess coins remaining in the storage box 19 pass to the coin return module 15 located in turn below the said storage box 19.

Figure 7:
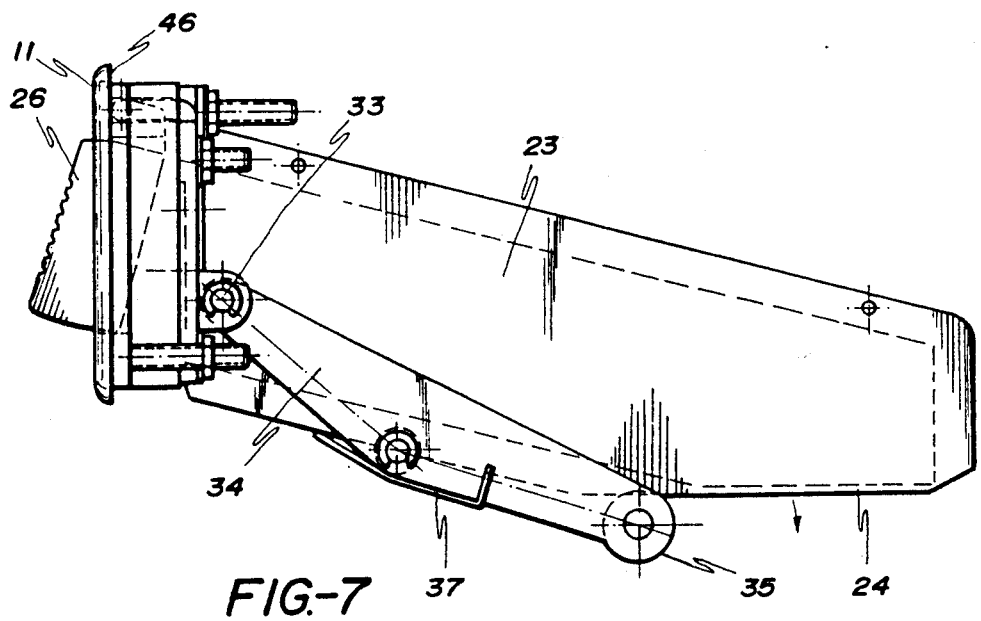
FIG. 7.—Shows a side elevation close-up of the module for inserting coins.
Figure 8:
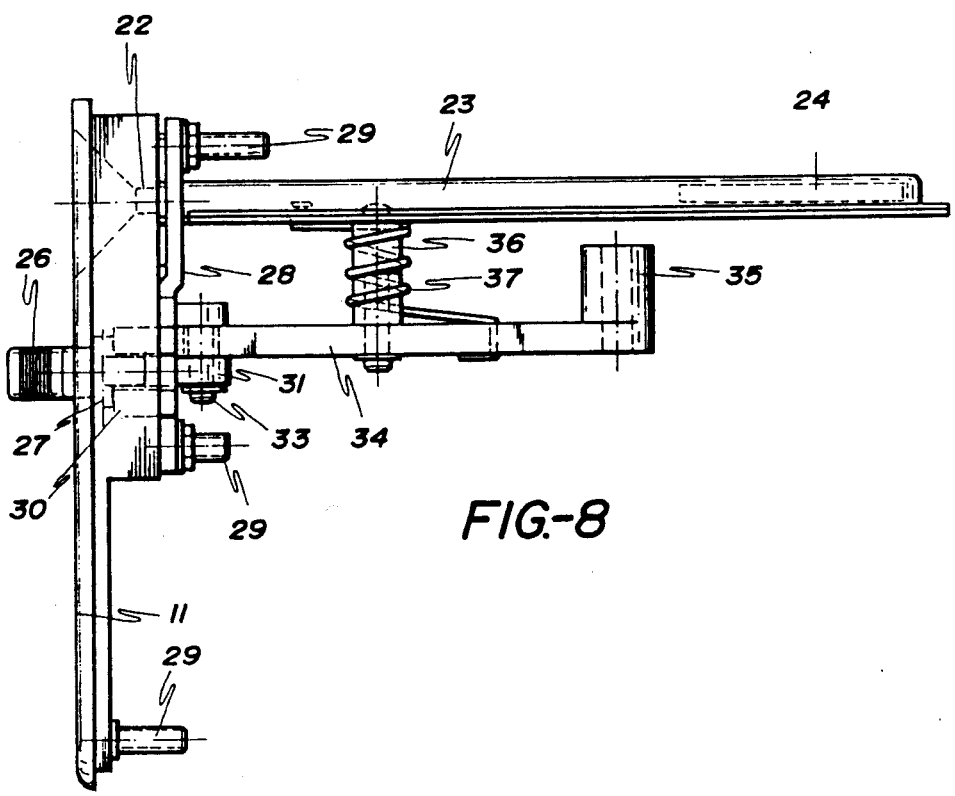
FIG. 8.—Shows in plan view the same module.
Figure 9:
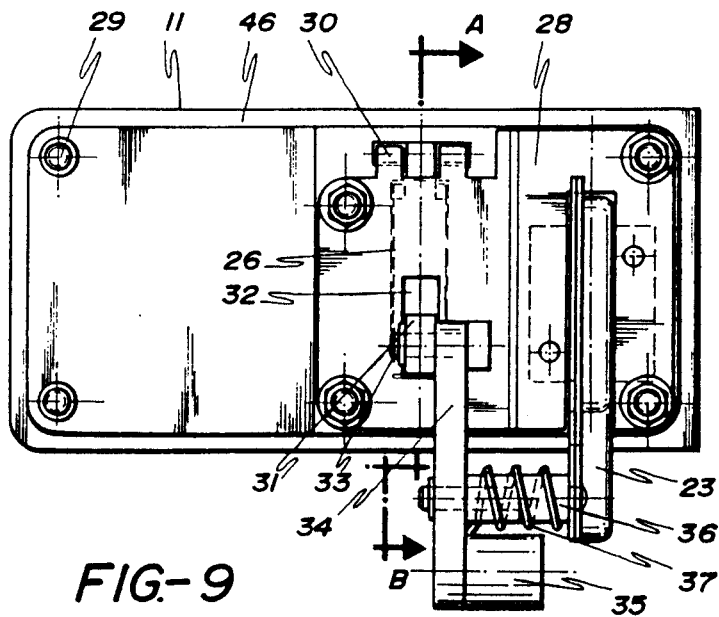
FIG. 9.—Shows a rear elevation.

The module 11 for inserting coins, is embodied in a plate which corresponds to the reference 11 itself, in which is cut a slot 22 for the insertion of coins, with its mouth considerably enlarged to facilitate this operation, the slot 22 opening out into a channel flattened on its sides 23 defining a ramp which slopes downwards and towards the rear, down which the coins roll, after having been inserted, towards the exit opening 24 in which the said the channel terminates, located at the interior end of the channel 23, as is seen in FIGS. 7 and 8, and for operational purposes facing the opening 25 of the coin selector 18 of FIG. 6.

Figure 10:
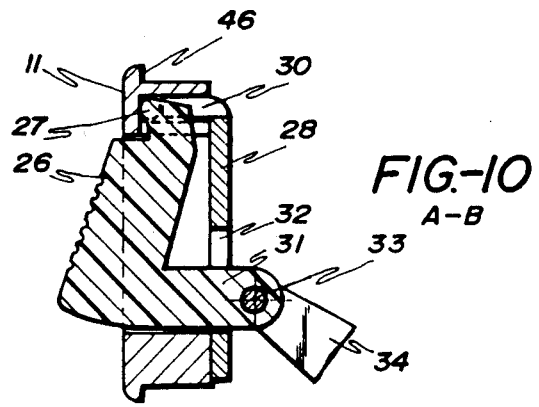
FIG. 10.—Shows a close up section at the level of the push button of the said module and according to the cutting line A-B of FIG. 9.
Figure 11:
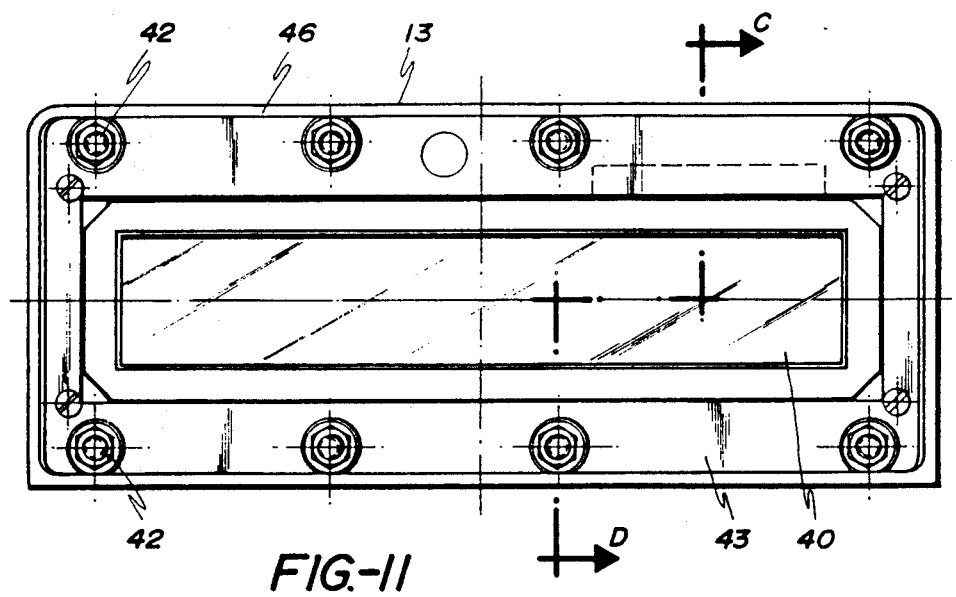
FIG. 11.—Shows a rear elevation of the module for viewing the information.

As is known, conventional coin selectors incorporate a side lever for freeing coins which can become stuck inside it. Therefore for operating this rocking plate, the coin insertion module 11 also incorporates a push button 26, also set into its front face, on which it is mounted so it can rock to and fro, to which effect the said push button shows on its upper surface a transversal extension 27, like a "tilde accent" (∼) defining two cylindrical diametrically opposed pivots, which are housed in a hollow behind the plate itself 11, as can be seen especially in the detail of FIG. 10 and in the interior of which they remain held in place by a rear lid 28, which is fixed to the plate 11 through screws 29 which emerge to the rear of the latter and which incorporates small jointed legs 30 which act on the ends of the tranversal extension 27, as in turn can be seen from in FIG. 8, this rear lid 28 constituting the true base to which the flattened channel for the coins 23 is attached.

The push button 26 and at the opposite end on its rocking shaft 27, incorporates an appendage 31 facing the rear, which passes through a window in the lid 28 and which, by its free end, and by means of the swivel 33 is joined to an arm 34 in an articulated manner which in turn at its free end is finished in a ram 35 which is what acts upon the classical side lever of the movable plate of the coin selector, this arm 34 being in turn mounted in its central zone so it can rock, specifically on a spindle integral with the flattened channel 23 and on which is coaxially mounted a spring 37 against which the arm 34 rocks when the front push button 26 is pressed.

As for module 12 for the insertion of credit , this incorporates a slot 38 in its front plate 12, which for operational purposes is facing a card reader, of any conventional type, attached to the rear face of the plate 12, which incorporates bolts similar to those which are incorporated in the plate 11, emerging singly from its rear face, for holding in place these modules on the door 3, with the aid of the corresponding nuts.

Figure 12:
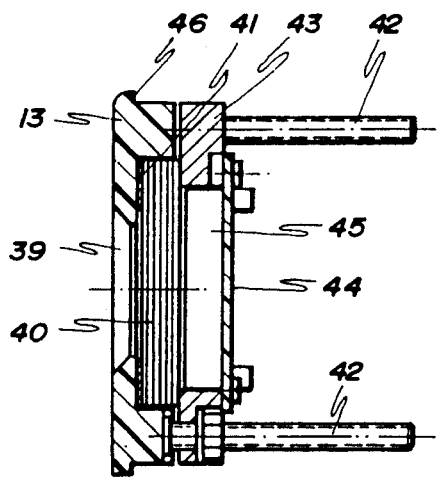
FIG. 12.—Shows a transversal section of the same module in accordance with the cutting line C—D of the previous figure.

As for the information viewing module 13, this is constituted by a rectangular metallic frame, of great strength, to which the reference 13 itself corresponds, defining a window 39 which makes it possible to see a liquid crystal screen, of a conventional type, through a sheet of glass 40, single or multiple layered, which also offers the maximum guarantees with regard to mechanical strength. More specifically and as can be seen in FIG. 12, the metallic frame 13 incorporates around its internal perimeter a graduated edge, into which is set a flat rubber frame 41 for the seating of the glass sheet 40, and from it emerge to the rear and to the side threaded bolts 42 for attaching it to the cover 3 of the upper box 1 of the telephone, these threaded bolts also serve at the same time for attaching a ring 43 behind, preferably made of plastic, which works as a retainer for the glass sheet 40 and as a physical support for the printed circuit board 44 belonging to the liquid crystal screen 45 located directly behind the protective glass sheet 40.

The information viewing module 13, also the keyboard module 14, which will be described later, are attached to the door 3 of the upper box 1 previously having been been inserted though the corresponding windows 7 and 8, as far as they can penetrate which is defined by their external perimeter graduated edge 46 with the aid of a pan 47 which is attached to the internal face of the door, with its concave surface facing forward and the bottom of which has bolts 42 passing through it so that these latter can receive the corresponding nuts 48 behind the pan 47.

Figures 13, 14:
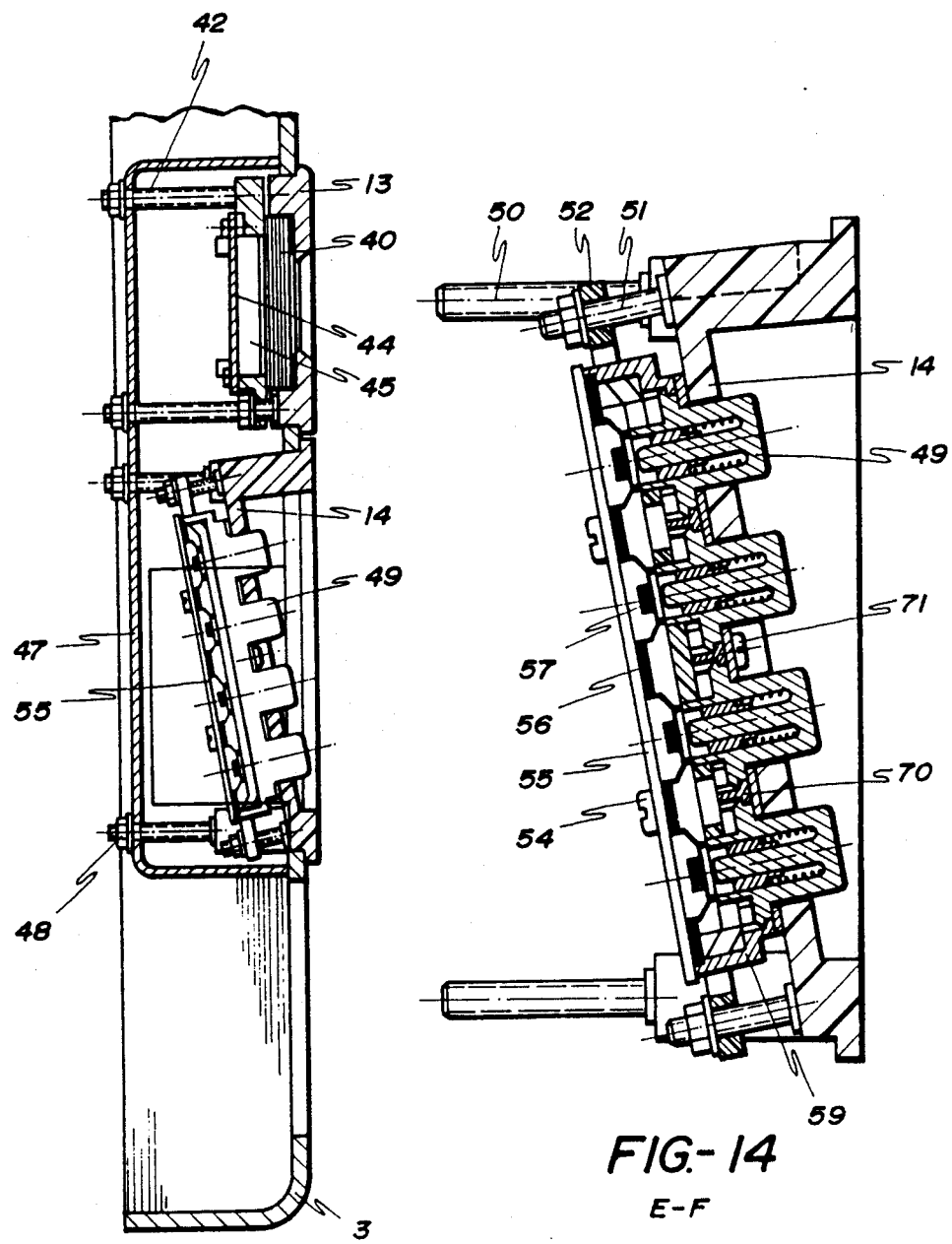
FIG. 13.—Shows a side elevation close up of the assembly of the module for viewing the information and of the keyboard on the door of the upper box.
FIG. 14.—Shows a sectional profile of the keyboard module, at the level of a vertical line of keys and in accordance with the cutting line E—F of FIG. 16.
Figure 15:
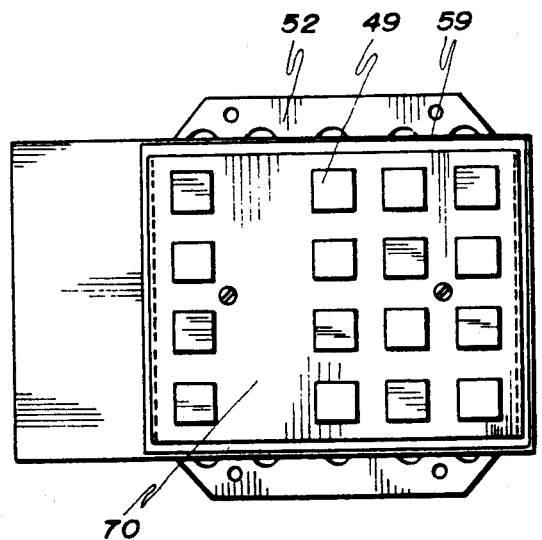
FIG. 15.—Shows a front elevation of the keyboard.
Figure 16:
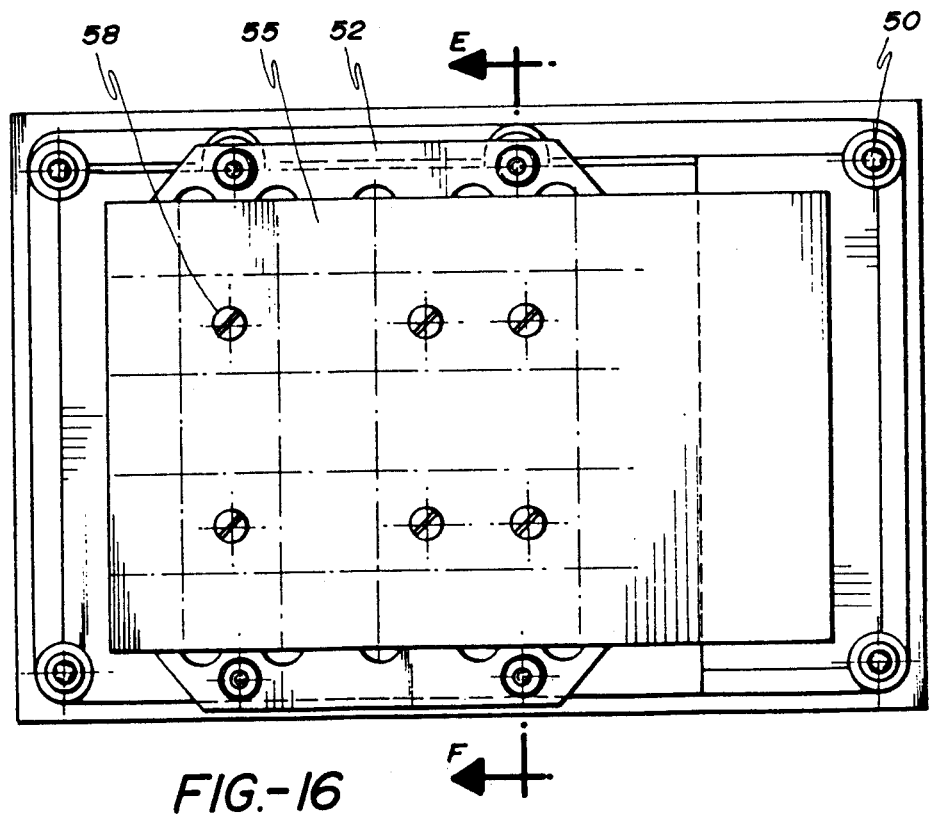
FIG. 16.—Shows a rear elevation of the complete keyboard module.
Figure 22:
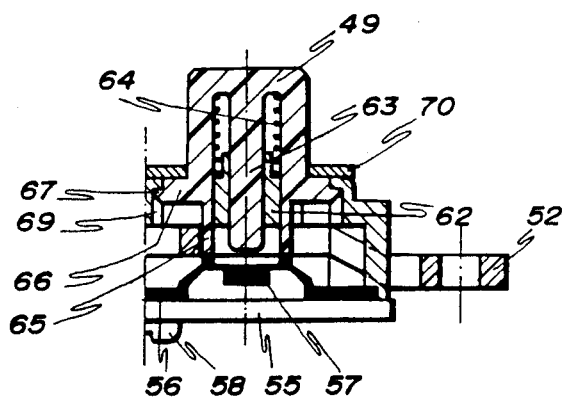
FIG. 22.—Shows the same close up in sectional view as FIG. 21 but complemented with the rest of the elements which are incorporated into the keyboard.

The keyboard module 14 is also constituted by a front plate, to which corresponds the reference number 14 itself, metallic and of great durability and strength, which is shaped like a sort of pan with the bottom inclined upwards and backwards, as can been seen especially in FIG. 14, and in the bottom of which are the necessary small windows for the various keys 49 of the keyboard.

Figure 23:
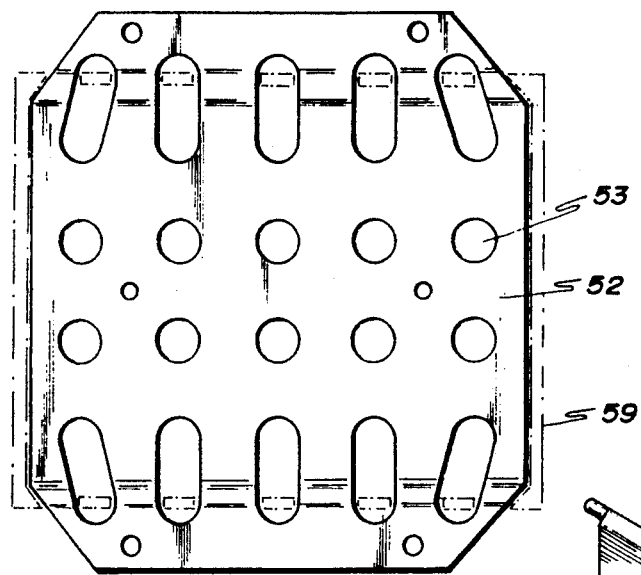
FIG. 23.—Shows a plan view of the metal frame on which the base shown in FIG. 17 is mounted.
Figure 24:
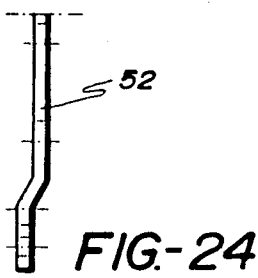
FIG. 24.—Shows a close up profile of the frame shown in FIG. 23.

More specifically, the plate 14, as well as bolts 50 similar to the bolts 42 of the information viewing module and with the same purpose of fixing the complete keyboard unit to the pan 47, incorporates behind, another four bolts 51 designed for attaching the metallic frame 52, shown in detail in FIGS. 23 and 24, a metallic frame provided with holes 53 corresponding to the various keys which is inserted between the electrically insulated base 59 and the printed circuit board 55. The plate has on its front face an elastic membrane with sectors 57 of conducting rubber, facing the keys 49, through which the dialling circuits are closed when the said keys are pressed. All of these pieces are mounted by means of drawbolts 58 fixed to the electrically insulated base 59, shown in turn in detail in FIGS. 17 to 21, a base which is provided with a number of housings 60, for each one of the keys, taking the form of cylindrical holes with two diametric and opposed arms 61 for supporting a small central guide sleeve 62 for an axial stem 63 of the corresponding key, whilst on the face of the said sleeve 62 rests a spring 64 which is housed inside the interior cavity of the key 49 and it tends to project outwards from this latter, that is to say the pressing of the key is made against the force of the said spring.

Each key 49 for its part has a prismatic-polygon shaped body, corresponding to FIG. 49 itself and as can be seen in detail in FIG. 20, hollow, closed on top and from which emerges, as well as the aforementioned axial stem 63, a cylindrical collar 65, wrapping around the sleeve 62 and with two wide windows or side openings clearly visible in the elevational view in FIG. 20. Corresponding with the union between the prismatic shaped body and the cylindrical collar of the key, the latter incorporates two flat extensions, lateral and on opposite sides 66, in the form of a circular trapezium with a maximum angle of 90° t, moreover each one of them has a radial apendage 67, so that one and the other apendages are situated diametrically opposite, the same as small radial enlargements 68 of the housings 60 of the base 59 which allow the insertion of the corresponding keys for their final holding in place by a simple turning motion and by a bayonet system after pressing axially on the keys 49 against the spring 64, when the lugs 67 and the openings 68 are directly facing each other, and with a subsequent partial turning motion into the length of the internal spaces 69 into which the said openings 68 are prolonged and which are clearly visible in FIG. 17.

In order to make the keys 49 immovable from their base 59, after assembly, the provision of a complementary plate or cover 70 has been foreseen provided with numbered polygonal shaped holes, correctly and positionally coinciding with the keys 49, which is also fixed by means of bolts 71 to the base 59 and consequently makes the keys immovable by turning them, making it impossible for these to be removed by means of their bayonet type assembly system.

As is obvious, the windows of this plate or cover 70, also coincide correctly, dimensionally and positionally with the windows in the front plate 14, through which the keys 49 emerge to the exterior, but it is important to point out that whilst in the base 59 there is a maximum number of housings 60 for the respective keys 49 and in the plate or cover 70 the same windows should exist as in the front plate 14, that is to say, the exterior plate which is in view, which is the protecting device for this module, can have the same number or less windows, in accordance with the number of keys foreseen for the telephone in each case, and more specifically in relation to the services which are foreseen for the telephone.

As for the coin return module 15, it is likewise constituted by a front frame, to which corresponds the reference 15 itself and counts with the same exterior and rear perimeteral graduated edge 73 for fitting into the window 9 and the cover 3 of the upper box 1, a frame which defines a wide window 74 normally obscured by a door 75 which swings by its upper edge.

To the rear face of the frame 15 is attached by means of bolts and with the aid of a pair of lateral lugs 76, a piece 77 which is shaped like a receptacle or pan with a straight inverted trapezoid profile, open above and in the front, where the aforementioned window 74 is located.

Figure 25:
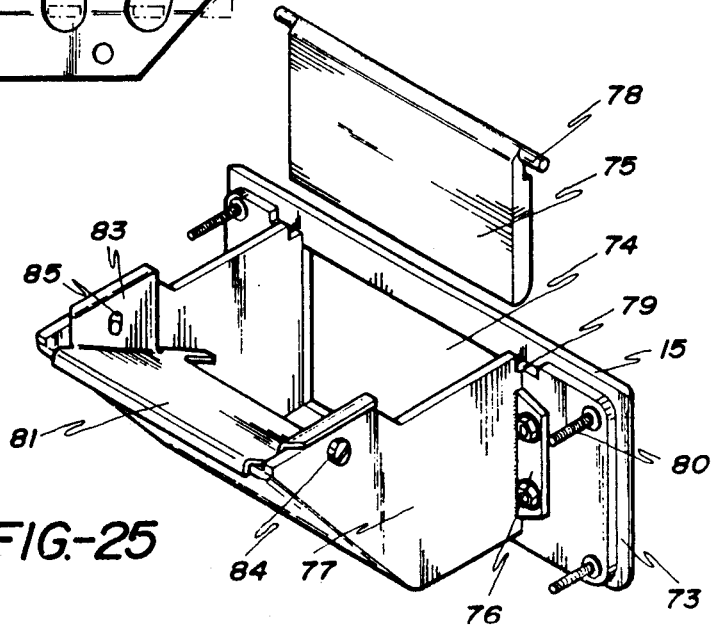
FIG. 25.—Shows a perspective view of the module for coin return.
Figure 26:
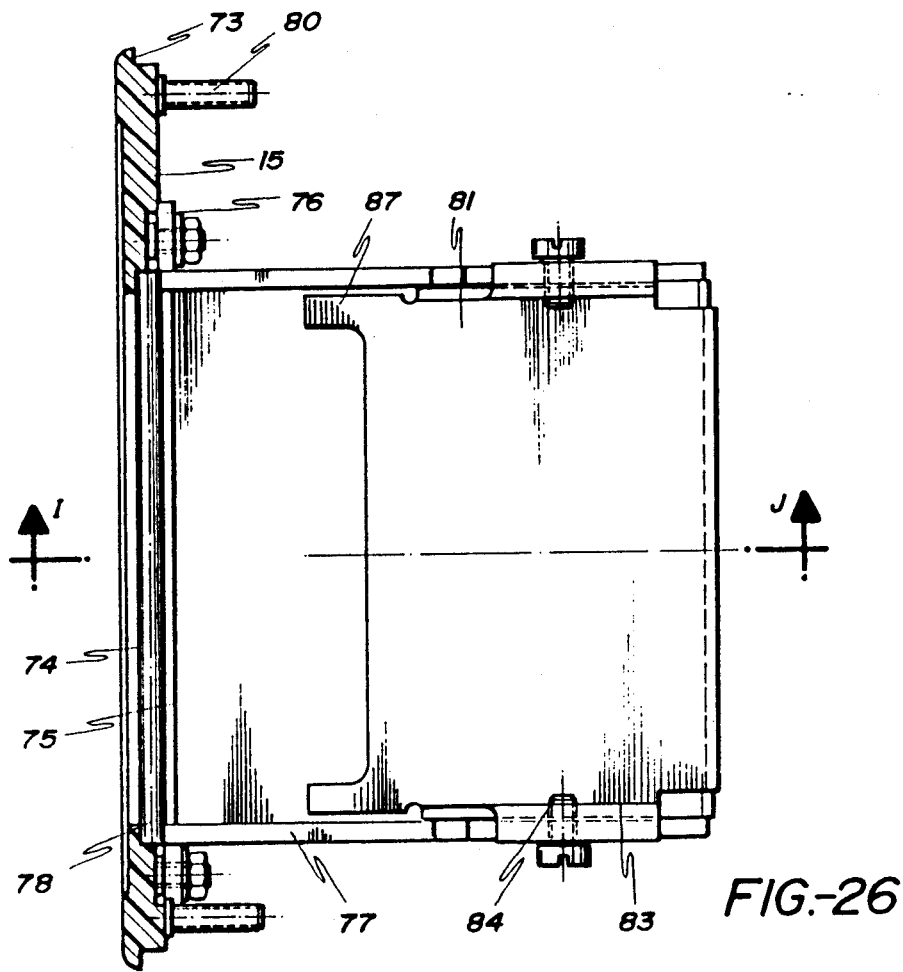
FIG. 26.—Shows a plan view of the same module.

It is also noteworthy that piece 75 which makes up the access door to this receptacle, extends by the ends of its upper edge into two cylindrical appendages which constitute the shaft for the swinging motion, and which rest on notches or graduations 79 which have been carried out for operational purposes upon the outer upper vertical surfaces of the side walls of the piece 77 defining the pan and which can be clearly seen in FIG. 25, the said door 75 remaining immovable, in the sense of not being able to extract it, by the very assembly of the unit against the window 9 of the frontal door 3, since the edge of the said window 9 closes off the aforementioned channels or graduations 79 in which the shafts 78 are lodged.

Figure 27:
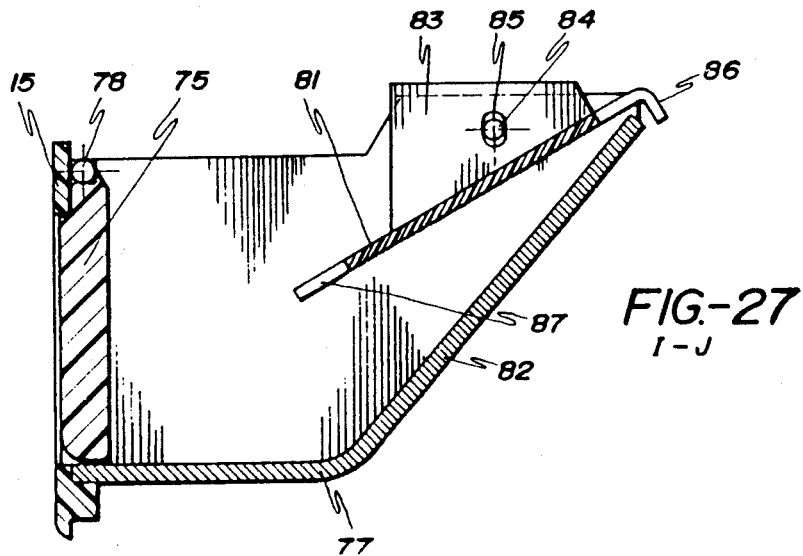
FIG. 27.—Shows a sectional elevation in accordance with the cutting line I—J of FIG. 26.

For attaching the module to the door 3, as in previous cases, the aforementioned frame 15 incorporates on its rear face and near the top, two threaded bolts 80.

it should also be pointed out, in relation to this coin return module, that in the interior of it is a plate 81 situated above the rear wall and inclined 82 from the aforementioned receptacle, also with an inclined diposition but with less inclination, as is shown in FIG. 27, the plate 81 showing two side wings 83 cranked first upwards and afterwards outwards, in order to attach it to the piece 77, specifically with the aid of bolts 84 which fit with some play in holes 85 cut in the wings themselves 83 and which allow a certain amount of mobility for the plate 81, which has its rear upper edge 86 cranked downwards, to overlap the rear upper edge of the wall 82 of the piece 77, whilst its front lower edge is endowed with a channel 87, of a great width and little depth against which the lower edge of the door 75 reaches its top limit, when this swings back in the sense that it opens.

in this way and as can also be clearly seen in FIG. 27, the coins fall onto the plate 81 which is quite some distance from the door 75, by which they reach the bottom of the receptacle made up of the piece 77, and in order to get access to them it is necessary to swing the door 75 backwards, with which the aforementioned door is in a frontally open position, this latter than completely obscures, with the aid of the plate 81, access to the interior of the telephone. On the other hand, the slight movement of the plate 81, through the cut holes 85 makes it possible to tap lightly the said plate 81 in the case a blockage of coins should occur.

As has been previously explained, when the telephone is designed to work only with credit cards, this coin return module will not be installed and the window 9 will be blocked off with a cap 17, that which is depicted in FIGS. 28 to 30, which consists of a rectangular plate, correctly and dimensionally in concordance with the window 9, provided with an internal perimetral ridge 88 for adapting it to the mouth of the window, and with threaded bolts 89 projecting from its rear face and designed for its ultimate fixing to the door 3 of the upper box 1 of the telephone as in previous cases.

Lastly, the window 10 of the front door 3 of the upper box 1 of the telephone is designed to receive the module 90 for hanging up the telephone hand set 16, a module which is clearly visible in FIGS. 31 to 36. The module is embodied by a rectangular plate, to which the reference number 90 itself corresponds, which counts with the same perimetral graduation 91 as with the aforementioned modules, for fitting it into the mouth of the window 10 and with the same bolts 92 for holding it in position.

On this plate 90 an upper edge area 93 is defined for bolting on a decorative plate 94, and immediately below it and indentation 95 correctly and dimensionally appropriate for receiving the earpiece of the telephone handset 16, whilst at the lower end area it is extended frontally 96 to define a hollow for the other end of the telephone hand set 16, the end which corresponds to the microphone, and with a slot 97 for the exit of the cable 98.

In the lower area of the indentation 95 is defined a wide step and in it, a window on which is located a small rocking lever 99 which obscures completely the said window and which is produced from the same very hard metal material as the plate 90 used for this and the other modules. The aforementioned rocking lever counts with two small cylindrical side prolongations 100, which make up its shaft for rocking on, which are housed in slots behind the plate itself or shield 90 and where they are held in their assembled position by the base itself 101 of the micro switch 102 which constitutes the real sensor element of the hanging up unit, a base 101 embodied by a plate which is basically shaped like a "U", with its side branches provided with end lugs 103 through which they are attached to the plate 90, by nuts 104 which are attached to threaded bolts protruding from the said plate, whose side arms and through their front top ends 105 close off the housing slots for the shafts 100, as can be seen especially in FIG. 36, and whose middle section, much narrower than its side branches, is extended by its rear edge at the same time as it is cranked upwards in an area 106 to which the micro switch 102 is really attached, this prolongatation 106 incorporating a further prolongation which defines a small leg 107 to which is attached one end of a spring 104 which with the base 101 relates to the arm 109 integral with the rocking lever 99 and is that which really works the micro switch 102 through the rod 110 of this latter.

Figure 37:
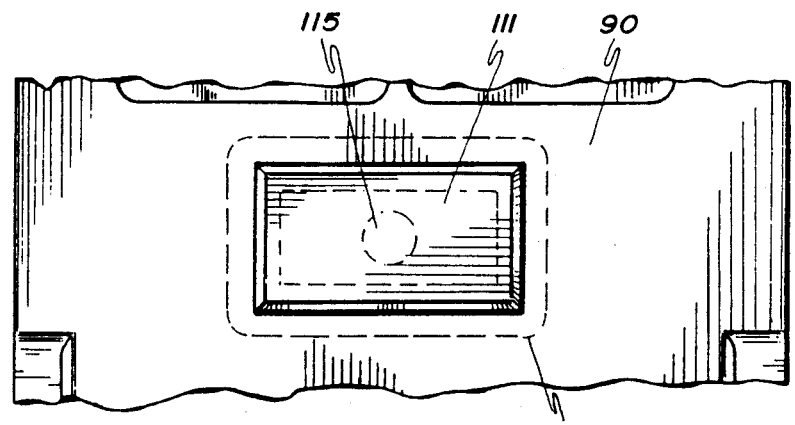
FIG. 37.—Shows another close up view of the module for hanging up the handset, in this case at the level of the re-call push button and also in frontal elevation.
Figure 38:
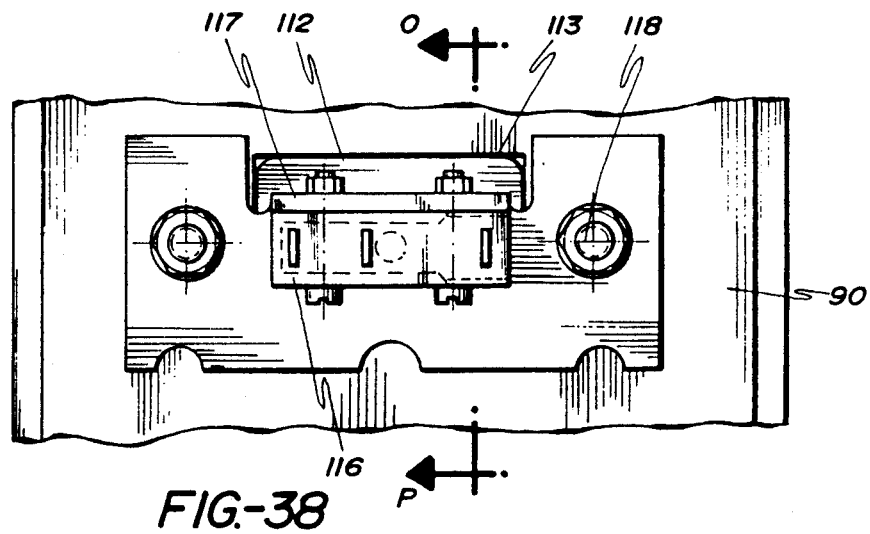
FIG. 38.—Shows the same close up as the previous figure in rear elevation.
Figure 39:
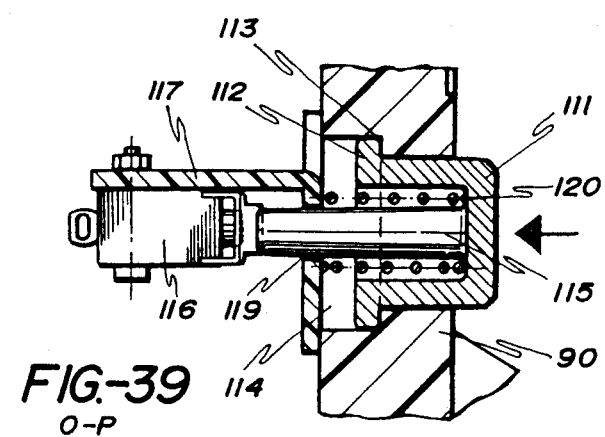
FIG. 39.—Shows a sectional profile of this same close up in accordance with the cutting line O—P of FIG. 36.
Figure 40:
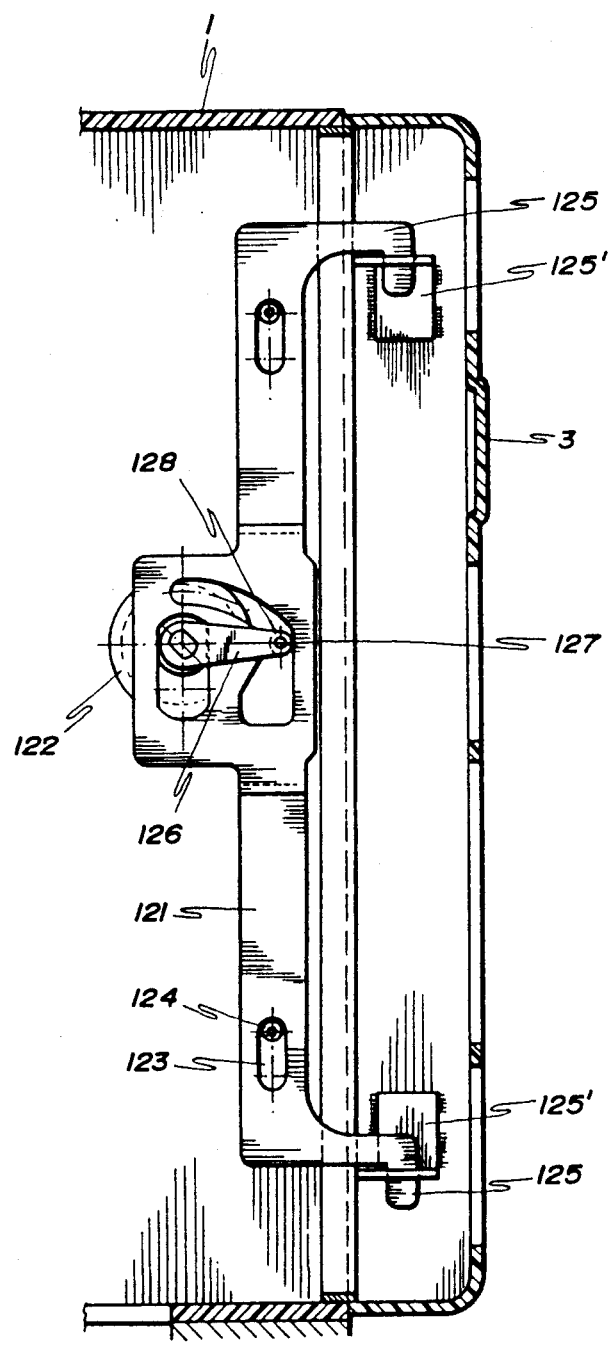
FIG. 40.—Shows a close up side elevation of the locking mechanism for the door of the upper box.

At a lower level, in this same plate 90 the recall button 111 is located, shown in detail in FIGS. 37 to 39. More specifically, the aforementioned button 111 is hollow and open at the rear with a wing 112 on its perimeter which works as the stop to retain it against the graduation 113, which is also perimetral, of the hole 114 which the plate 90 of this module for hanging up the telephone handset has for this purpose, at the same time as the said button 111 has an axial stem 115 through which it pushes on a micro switch 116 integrated into a base 117, with an angular shape and which in turn is attached by bolting on to threaded bolts 118 protruding from the rear face of the plate 90, on both sides of the hole or window 114. Moreover, and as can been seen especially in FIG. 39, this base 117 obscures the majority of the area of the interior of the window 114 and offers up a hole 119 for the passage and guiding of the stem 115, at the same time as it acts as a basis for support for the spring 120 which tends to force the button 111 outwards, to the limit of its possibilities shown in FIG. 39 defined by the flange 112 and the graduation 113.

The door 3, suitably hinged to the box 1 incorporates a security lock 121, which operates through a locking mechanism 122 accessible through one of the side walls of the box, as can be seen in FIG. 1, the catch 121 being double and consisting of a slide, to which corresponds the reference 121 itself, provided with cut holes 123 for its guidance over lugs established for operative purposes on the side wall corresponding to the upper box 1 and which at its ends is extended into the respective catches 125 properly speaking, which can enter into sheet metal angular orifices 125, properly integrated into the door 3, the movement of the catches being effected with the aid of an articulated connecting rod linked to the locking mechanism and provided at its free end with a drum 127 which revolves in a cut hole 128 in the middle zone of the moving piece 121.

it is necessary to point out in this respect that this locking mechanism can be endowed with complementary means of closing which can be controlled from the telephone exchange to which the telephone is connected, so that it cannot be opened even by the company personnel themselves without authorisation and at the right moment from the aforementioned exchange.

Turning now to the cable 98 which runs between the the telephone handset 16 and the apparatus, the said cable 98, properly armoured, is joined to the upper box 1 of the apparatus, more specifically in one of the side walls of the same, with the aid of an articulating mechanism which makes it possible to vary the exit angle of the cable within certain limits.

In this respect and more specifically, in the side wall of the box 1 a large circular hole 129 is cut and in this area a piece 130 is fitted to the exterior of the box 1, also of great strength and of the same metallic material as the rest of the external elements of the telephone, a piece which is provided with a hollow cylindrical collar 131, through which the piece enters the box through the hole 129, the said collar being coaxially joined in its turn inside a sleeve 132 in the interior of the box 1 and provided with an expanded area 133 on its perimeter by means of which it rests against the internal face of the said box 1, framing the hole 129 and through which it is fixed to the latter by bolts 134, as in previous cases. Additionally the collar 131 of the piece 130 is provided with a perimeteral graduation 135 which limits the axial joining of the sleeve 132 inside this piece and which, in consequence, prevents the perifery of the piece 130 and the perifery 133 of the internal piece from pressing against the wall 1, which would prevent the already several times mentioned piece 130 from turning, which moreover remains axially fixed to the sleeve 132 with the aid of an expansion bolt 136. The sleeve 132 has a protruding ridge, shaded in FIG. 41 so that it is identifiable at first sight, which acts as the limiting point of the swing of piece 130, a swing of approximately 90° limited by the ends of the aforementioned bolt 136.

Additionally the piece 130 incorporates a second cylindrical collar 139, perpendicular to 131, that is to say, in a radial situation, hollow, inside of which is a screw clamp 140 for the corresponding end 141 of the armoured protection of the cable 98, a screw clamp which in its turn is fixed with a set screw 142, continuity being established between the hollow interior of the said sleeve 140 and the hollow interior 143 of the collar 131 which accedes to the interior of the box 1.

Figure 43:
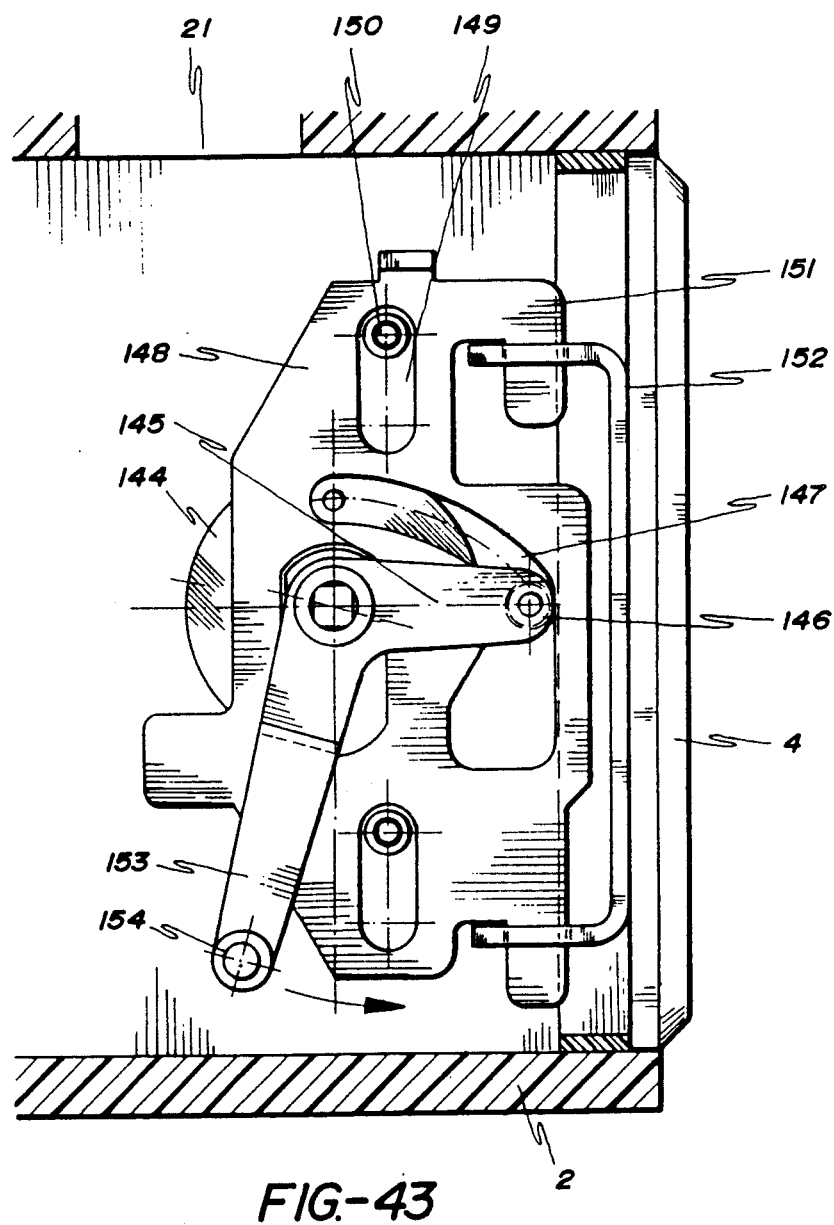
FIG. 43.—Shows a side elevation of the locking mechanism for the door of the lower body or strong box.

Turning now to the lower strong box 2, this has a locking mechanism similar to that of the upper box 1, that is to say, with a side located locking mechanism 144 which, through a connecting rod 145 finishes in a drum 146 working inside a cut hole 147 corresponding to a sliding plate 148, provided with cut holes 149 for its guidance with the aid of lugs 150 integrated with the corresponding side wall of the strong box 2, the said plate 148 being provided with extensions 151, cranked, which make up the catches correctly speaking, which enter holes in the side branches of a "U" shaped piece, 152, adequately integrated with the internal face of the door 4. In this case and as a complement to the described structure, the aforementioned connecting rod 144 is extended at the beginning by an arm 153 finished in a roller 154, which in the opening operation pushes on the door 4, as is shown by the arrow in FIG. 43, helping to start the opening movement of the said door, which is of great interest in as much as the said door 4, as can be clearly seen in FIG. 1, does not possess a handle and moreover is for the most part embedded in the mouth of the box, as in turn can be seen from FIG. 43, and on the other hand its weight is very considerable, given the high degree of armour plating which is foreseen for this body or strong box 2. It is necessary to point out in this respect that this locking mechanism can be endowed with additional locking means which can be controlled from the telephone exchange to which the telephone is connected, so that it cannot be opened even by the personnel of the company itself, without prior authorisation and at the right moment from the aforementioned exchange.

in the interior of the strong box 2 and as the real collector of the coins, is situated a money box provided with a lid 155, which can be sealed, for which purposes it has a small clip 156 on one of its edges and on the other edge two small lugs 157, with perforations 158 for passing through them what is really the seal. This lid 155 is provided internally with an additional wall 159, which is shaped like a sort of pan with little depth, which is adapted to the internal face of the lid and which is attached to the same with the aid of bolts 160, so that between the two walls there is a flat chamber 161 in which a swinging plate 162 moves freely, provided with a window 163 for coins to fall through into the interior of the money box, which window can be in a position of facing, or not, other similar windows 164 and 165 existing respectively in the external wall 155 and in the internal wall 159 of the lid and which are clearly visible in the close up detail of FIG. 45.

More specifically, the piece 162 swings on the shaft 166 and in its swing a pivot 167 participates essentially, this protrudes from the roof or upper wall of the strong box 2 and moves simultaneously with some play in a groove 168 running in a direction from front to back of an auxiliary plate 169 also located inside the flat chamber 161, adequately fixed by bolts 170, and a transversal groove 171 which the swinging plate 162 is provided with, the auxiliary fixed plate obviously being provided in turn with another hole 172, for passage of coins, facing for operational purposes holes 164 and 165 in the external and internal walls of the lid and at the right moment the hole 163 of the swinging piece also faces it.

With this structure a spring strip 173 works pressing upon the edge 174 of the swinging plate 162, against its articulation 166, a spring strip which stabilises the aforementioned piece, acting like a "brake" on it, and also on the lower face of the swinging piece 162 a pivot 175 is integrated which moves freely in a curved groove of the auxiliary plate 169 and which is aided by a catch 177, mounted to swing on a shaft 178 and related in turn to a cam disc 179 which also is mounted on a shaft 180, finished in a 180° working head, accessible from the interior of the lid, as can be seen in FIG. 45, the catch 177 incorporating an angular cut out area 181 in which, in a set moment the aforementioned pivot 175 of the swinging piece 162 is stopped, as will be seen now.

According to this structuring and as shown in FIG. 46, when the money box is inserted in the strong box 2, the swinging piece 162 positions itself so that the mouth of its groove 171 coincides with the mouth of the groove 168 of auxiliary plate 169. Situated thus, when the insertion of the money box starts, the pivot 167 in the roof of the strong box locates itself in them. As the money box enters the strong box, the pivot 167 runs along the groove 168 drawing with it the the plate 162, which it makes swing progressively to the limit position shown in FIG. 47 and corresponding to the total entry of the money box inside the strong box, then the catch and the cam disc position themselves as shown in detail in FIG. 47, a position in which the hole 163 of swinging piece 162 remains for operational purposes lined up with holes 164, 172 and 165 of the upper wall of the lid, of the complementary plate 169 and of the lower or interior wall 159 of the said lid, so that the coins which are being inserted into the telephone will duly fall into the money box, since evidently all these holes in turn are lined up with the holes 21 which connect the upper box 1 of the telephone with the lower strong box (FIG. 6).

When the money box is extracted and merely by its outwards movement, the pivot 167 makes the plate 162 swing back in the opposite direction, and by the position the cam disc 179 takes up, as shown in FIG. 48, at the end of the extraction the pivot 175 houses itself in step 181 of the catch 177, so that the swinging plate 162 cannot move in the opposite direction again, that is to say, neither is it possible to insert the money box again immediately into the strong box, nor can any attempt be made on the said money box with a long tool so that piece 162 swings back and manages to line up hole 163 with the rest of the holes in the lid, in order to remove coins through them.

in order that the money box can be re-inserted into the strong box, it is necessary to break the seal at the time when it is intended to remove the contents and when it is open and before re-sealing it, press directly on the head 180′ of the shaft on which cam disc 179 swings and make the latter take up the position shown in FIG. 46, in which its cut out area 181 moves out from the trajectory of the pivot 171 and, consequently, the swinging plate 162 is free to turn on its shaft 166, with no more restriction than that of the brake defined by the spring strip 173 and, consequently, allow the insertion of the money box in the strong box, the pivot 167 working on the often aforementioned swinging plate 162, to the limit position when the grooves or holes are lined up for the coins to pass through.

In this manner a modular telephone is achieved, in which the various operating modules are easily interchangable, especially for obtaining telephones with different degrees of attributes, a telephone which moreover offers the best guarantees of remaining intact, as much against delinquents as against acts of vandalism, and which moreover also offers the best security guarantees with regard to the money collected inside it, in as much as the money box containing the said money is extracted from the telephone, sealed, and can be kept in this state until it is considered opportune to open it, the said money box being substituted with an empty one which is also properly sealed.

it is not considered necessary to make this description any longer for any expert in the subject to understand the scope of the invention and the advantages which derive from it.

The materials, shape, size and the situation of the elements will be liable to change always and when this does not suppose any alteration in the essentials of the invention.

The terms in which this memorandum has been written should be taken in the broadest sense and not a limiting one.

We claim:

1. Modular public telephone for outside use, which, being conceived for operation by means of coins and/or credit cards, is essentially characterized by being constituted by means of combining operationally two boxes 1 and 2, adequately armoured, physically independent of each other, the upper box 1 containing the telephone's mechanisms and the lower box 2 constituted by a strong box for collecting the coins, a strong box which is not attached when the telephone works exclusively with credit cards, and when this is not so, it is fixed to box 1 by any conventional method, it having been foreseen that these boxes are both provided with front doors 3 and 4, of which door 3 corresponding to the upper box is furnished with a number of windows 5, 6, 7, 8, 9, and 10, designed for receiving and holding in place the respective operating modules, more specifically a coin insertion module 11, a credit card insertion module 12, a module for viewing information 13, a keyboard module 14, a coin return module 15, and a module for hanging up the telephone handset 16, with the peculiarity that some of these modules optionally can be substituted by corresponding caps, more specifically modules 11 and 12 for insertion of coins or credit cards, and module 15 coin return, when they are not necessary according to the attributes of the telephone, which caps, the same as the modules themselves, are provided on their rear face with threaded bolts for holding them in place on the aforementioned lid 3 of the upper box of the telephone.

2. Modular public telephone for outside use, according to the claim 1, characterized because the module for coin insertion is made up of a frontal plate or shield 11, which, as with the other modules, incorporates a rear perimeter graduation 46 which rests against the mouth of the corresponding window 5, a shield of a highly resistant material in which the necessary slot 22 for the insertion of coins is for operational purposes facing a channeling 23 down to a coin selector device 18, which is in turn situated on top of a storage box 19 which discharges them, either to the money box along channeling 20 or to the coin return module 15, it having been foreseen also that the shield 11 incorporates a small window in which a push button 26 furnished with a transversal upper shaft 27 moves freely rocking to and fro, forming a single piece with it, which is housed in a cavity in the rear of the shield 11 itself, a cavity which is closed in with the aid of small side pieces 30 belonging to a rear cover 28 integrated by means of bolts 29 to the shield itself and provided with a window 32 through which an arm 31 of the push button 26 passes to the interior of the cover, which is joined in an articulated manner to a rocking lever 34, at its middle point, on a shaft 36 and provided at its free end with a ram 35 for freeing coins which have become stuck in the coin selector 18, the shaft 36 incorporating coaxially a spring 37 which tends to hold the lever 34 in its non-operational position.

3. Modular public telephone for outside use, according to claim 1, characterized because the module for viewing information 13 is made up by means of a metallic frame 13 of great strength, provided with an internal perimeter graduation in which is housed a flat rubber frame 41 for seating a multi-layered piece of glass 40 which is highly resistant to blows, held in place by a rear frame 43, of an insulating type, with the aid of the threaded bolts 42 themselves, for attaching the whole module, this insulating frame 43 also acting as the physical base for the liquid crystal screen and the printed circuit with which it operates.

4. Modular public telephone for outside use, according to claim 1, characterized because the keyboard module also incorporates a front shield 14, with rear bolts 50 for holding it to the lid 3, more specifically with the aid of a pan 47 inside the said cover and which simultaneously constitutes the means of attaching the information viewing screen, also incorporating more bolts 51 for fixing a metal frame 52, provided with a network of holes 53 coinciding numerically and positionally with the keys, a metal frame behind which is attached the printed circuit board corresponding to the said keyboard, with an elastic membrane 56 interspaced, provided with sectors 57 of conducting rubber for operational purposes facing the various keys 49, whilst in turn on the front face of the said frame an insulted base is fixed, provided with a number of housings for the corresponding keys, which are lodged in the said housings by bayonet and which show in their locating sector a prismatic-polygonal shape, or rather prismatic quadrangular, the said keys remaining immovable in a rotating sense, with the aid of an auxiliary plate provided with windows which coincide numerically, correctly and positionally with the said keys, and facing for operational purposes those which are incorporated into the shield.

5. Modular public telephone for outside use, according to claim 4, characterized because each housing 60 in the electrically insulated base 59 of the keyboard module has a basically cylindrical shape, with two radial appendages 61 and diametrically opposed, which support a central cylindrical sleeve 62 in which a stem 63 moves freely, which is axially situated in the interior hollow of the key 49 and on whose face a spring 64 rests, which in its turn axially surrounds the said stem, having been foreseen that each key, further away from its prismatic working sector, incorporates a cylindrical sector 65 which embraces the housing sleeve, with diametrically opposed openings in which the sustaining arms of the said sleeve move freely, whilst at the start of the said cylindrical collar are two lateral diametrically opposed protrusions 66, in the form a circular trapezium, of a diameter in accordance with the base housings 60 and with respective appendages 67 through which the bayonet type coupling is made, in correspondence with which each housing in the base shows in turn two diametrically opposed grooves 68, which, to the rear, are extended into their respective openings 69 for insertion of the said small side pieces 67.

6. Modular public telephone for outside use, according to claim 1, characterized because the coin return module 15 also defines a high strength frame, with bolts 80 in its rear face for attaching it to the door 3 of the upper box 1, a frame 15 whose rear face is bolted to a piece 77 like a pan open on top and also frontally open through the wide window 74 which defines the shield, in correspondence with which a swinging door 75 is located, provided on its upper edge with extensions 78 consisting of cylindrical pivots defining the shaft on which the said piece swings, pivots which fit into recesses 79 in the front upper corners of the side walls of the piece 77, recesses 79 which are closed off by the wall itself of the door 3 after the insertion of the module, with the peculiarity that the piece 77, whose rear part is notably inclined upwards and backwards, receives in this rear area a complementary plate 81, less inclined, and against whose frontal cut away edge 87 the lower edge of the door 75 stops, when this swings back, towards its maximum opening position, with the peculiarity moreover that the internal piece 81 is fixed inside the pan through bolts 84 which move freely in slightly enlarged holes 85, which are in the side wings 83 of the said piece 81, which confer on this piece a degree of mobility.

7. Modular public telephone for outside use, according to claim 1, characterized because the module for hanging up the telephone handset, embodied equally by the high strength shield which is anatomically shaped to receive the telephone hand set, incorporates below the level of the indentation 95 into which the earpiece fits, a window in which is located a rocking lever 99, provided with cylindrical side extensions 100, which define pivots for swinging which fit into lateral cut out grooves in the shield 90 itself and which are held in place by an auxiliary base 101, of sheet metal, in a "U" shaped form, and more specifically at its front upper top ends 105 of its side branches, through which the said base 101 is attached to the shield 90 by means of nuts 104 which move with some play on threaded bolts protruding from the shield 90 and which pass through the aforementioned base 101, which on its middle branch evidences an upwards extension 106, to which is fitted the micro switch 102 operated by a lever 109 integrated with the rocking lever 99 and permanently under pressure from a spring 108 which relates it to a small side piece 107 protruding from the upper edge of the base 106 itself.

8. Modular public telephone for outside use, according to claim 7, characterized because the recall button 111, also situated on the shield 90 of the module for hanging up the telephone hand set, is hollow, open at the rear, provided with a perimeter flange 112 around its mouth and an axial stem 115 facing backwards, the aforementioned perimetral thickened area 112 moving freely in a graduation 113 in the shield 90, whilst the stem 115 passes through a rear base 117, through a hole 119, to press against the corresponding micro switch 116 which is integrated with the base 117, which is attached to the rear face of the shield 90 with the aid of threaded bolts 118 protruding from this latter, situated on both sides of the hole 114 in which the push button 111 moves freely, at the same time a spring 120 is located between the said push button and the base 117 which tends to force the push button outwards and which is coaxial with the stem 115.

9. Modular public telephone for outside use, according to claim 1, characterized because the side wall of the box 1 incorporates at an upper level and in correspondence with the exit for the armoured cable 98, a hole 129 into which is inserted the collar 131 of a swinging piece, whose perifery rests against the external face of the wall of the box 1 and which is retained axially with the aid of a sleeve 132, which is in turn fixed to the internal face of the box 1 with the aid of threaded bolts 134, protruding from this latter, the collar 131 and the sleeve 132 being externally related to each other through a perimeter step 135 in the former and internally through an expansion bolt 136 for axial retention, with the peculiarity that one of these two elements, specifically the sleeve 132, evidences a protrusion which acts as a limit stop to the swing of the piece 130, a swing of approximately 90° limited by the ends of the aforementioned bolt 136, it having been foreseen moreover that the piece 130 is extended radially and externally into another collar 139, in the interior of which is placed a retaining sleeve 140 for the end 141 of the armoured protection of the cable, a sleeve which communicates directly with the hollow interior 143 of the collar 131 and which is fixed to the collar 139 with the aid of a set screw 142.

10. Modular public telephone for outside use, according to claim 1, characterized because both the door of the upper box 1 and the door of the lower strong box 2 are workable through their corresponding locks 122 and 144, located on the side wall of the respective boxes, locks which work through their corresponding connecting rods 126 and 145, finishing in drums 127 and 146, on sliding elements 121 and 148, provided to this effect with cut out slots 128 and 147 in which the aforementioned drums move freely, suitably guided through cut holes 123 and 149, in which pivots 124 and 150 move freely, and provided with double catches 125 and 151, which in the case of door 3, lock into holes of angled steel sections 125' integrated with the door, whilst in the case of the lower door 4, lock into holes made of a single piece 152, in the shape of a "U", located on its side branches, it having been foreseen moreover that the connecting rod 145 corresponding to the locking mechanism of the strong box 4, is extended at the beginning into an arm 153, finishing in a roller 154, which during the opening operation pushes on the inside face of the door 4 setting in motion the initial opening of the same.

11. Modular public telephone for outside use, according to claim 1, characterized because the strong box houses inside it a money box provided with a lid 155, which can be sealed, a lid with a double wall 155-159 structure, so that inside it a chamber 161 is formed, in which is located a fixed auxiliary plate 169 and a swinging plate 162, provided for the purpose with a shaft 166, with the peculiarity that the exterior wall 155 of the lid, its internal wall 159 and the fixed plate 169, are all provided with respective holes 164, 165 and 172, for the coins to pass through, permanently facing each other and facing the communicating holes 21 between the upper box 1 and the lower box 2, whilst the swinging piece incorporates another cut out hole 163, which can be, or not, lined up with the previously mentioned ones, with the peculiarity that the said swinging piece 162 also evidences a groove 171 in which a pivot 167, protruding down from the roof or overhead wall of the strong box, moves freely and which simultaneously moves freely in a groove 168 of the fixed auxiliary plate 169 so that when the money box is inserted inside the strong box the movable plate 162 swings automatically into a position where its hole 163 is lined up with the rest, whilst on withdrawal, it moves in the opposite direction and the said groove is then out of phase with the others and consequently the plate 162 blocks off the access to the money box groove.

12. Modular public telephone for outside use, according to claim 11, characterized because the swinging plate 162 receives on its edge 174 opposing its articulating shaft 166 the braking action of a spring 173 and it incorporates in this end area and on its lower surface a pivot 175 which moves freely in a groove 176 of the fixed auxiliary plate 169, a pivot with which a catch 177 collaborates in the field of action of the said pivot, mounted so it can swing on the shaft 178 and permanently under pressure from a spring against a cam disc 179, it having been foreseen that the said catch incorporates a dihedral shaped cut away area 181 into which the pivot 175 of the swinging plate 162 fits and which stops the movement of the said plate when the money box is withdrawn from the strong box, with the peculiarity that the said cam disc 179 evidences the shaft 180 it turns on, finished internally in a head 180', which can be operated from inside the lid and through which, manually and with the box open, the catch 177 can be pressed to free or to release the pivot 175 of the plate 162.

* * * * *

UNITED STATES PATENT AND TRADEMARK OFFICE
CERTIFICATE OF CORRECTION

PATENT NO. : 4,974,257

DATED : November 27, 1990

INVENTOR(S) : Francisco I. Palomeque, et al

It is certified that error appears in the above-identified patent and that said Letters Patent is hereby corrected as shown below:

On the title page:

Item [19] "Ibanez et al" should read --Ibañez Palomeque et al--.
In the listing of the inventors, delete "Francisco P. Ibañez" and insert in place thereof --Francisco Ibañez Palomeque--, and delete "Manuel M.J.Garcia" and insert in place thereof --Jose Manuel Garcia Morales--.

Signed and Sealed this

Fourteenth Day of January, 1992

Attest:

HARRY F. MANBECK, JR.

*Attesting Officer*     *Commissioner of Patents and Trademarks*